(12) United States Patent
Ishigame et al.

(10) Patent No.: US 8,366,183 B2
(45) Date of Patent: Feb. 5, 2013

(54) VEHICLE-BODY STRUCTURE OF VEHICLE

(75) Inventors: Katsuyoshi Ishigame, Hiroshima (JP); Masaki Motoki, Hiroshima (JP); Yuichi Sugimura, Hiroshima (JP); Yoshikazu Nishimura, Hiroshima (JP)

(73) Assignee: Mazda Motor Corporation (JP)

( * ) Notice: Subject to any disclaimer, the term of this patent is extended or adjusted under 35 U.S.C. 154(b) by 140 days.

(21) Appl. No.: 12/904,726

(22) Filed: Oct. 14, 2010

(65) Prior Publication Data

US 2011/0095567 A1    Apr. 28, 2011

(30) Foreign Application Priority Data

Oct. 26, 2009    (JP) .................... 2009-245348

(51) Int. Cl.
*B62D 25/04* (2006.01)
(52) U.S. Cl. ................................... 296/193.06
(58) Field of Classification Search ............. 296/193.05, 296/193.06, 203.03, 202, 187.03, 187.12
See application file for complete search history.

(56) References Cited

U.S. PATENT DOCUMENTS

| 5,560,672 | A  | * | 10/1996 | Lim et al. ............... 296/187.05 |
| 5,671,968 | A  |   | 9/1997  | Masuda et al. |
| 6,474,726 | B1 | * | 11/2002 | Hanakawa et al. .......... 296/191 |
| 7,152,914 | B2 | * | 12/2006 | Dingman et al. ......... 296/193.05 |
| 7,976,098 | B2 | * | 7/2011  | Nishimura et al. ....... 296/193.06 |
| 2006/0273630 | A1 | * | 12/2006 | Chen et al. ............... 296/203.03 |

FOREIGN PATENT DOCUMENTS

| JP | 2004-130826 A | 4/2004 |
| JP | 2007-210531 A | 8/2007 |
| JP | 2009-143252 A | 7/2009 |

OTHER PUBLICATIONS

The Extended European Search Report dated Feb. 1, 2011; Application No. 10013777.7-2425.

* cited by examiner

*Primary Examiner* — H Gutman
(74) *Attorney, Agent, or Firm* — Studebaker & Brackett PC; Donald R. Studebaker

(57) ABSTRACT

At an upper part of a center pillar, a length L1 of a covering portion of a pillar inner panel is set to be substantially equal to a distance L2 between a pair of flange-ridgeline portions of a pillar reinforcement. Meanwhile, at a lower part of the center pillar, a length L3 of a covering portion of the pillar inner panel is set to be longer than a distance L4 between a pair of flange-ridgeline portions of the pillar reinforcement. Accordingly, a vehicle-body structure of a vehicle which can secure the proper absorption function of the vehicle collision load with cooperation of the first and second members can be provided.

7 Claims, 16 Drawing Sheets

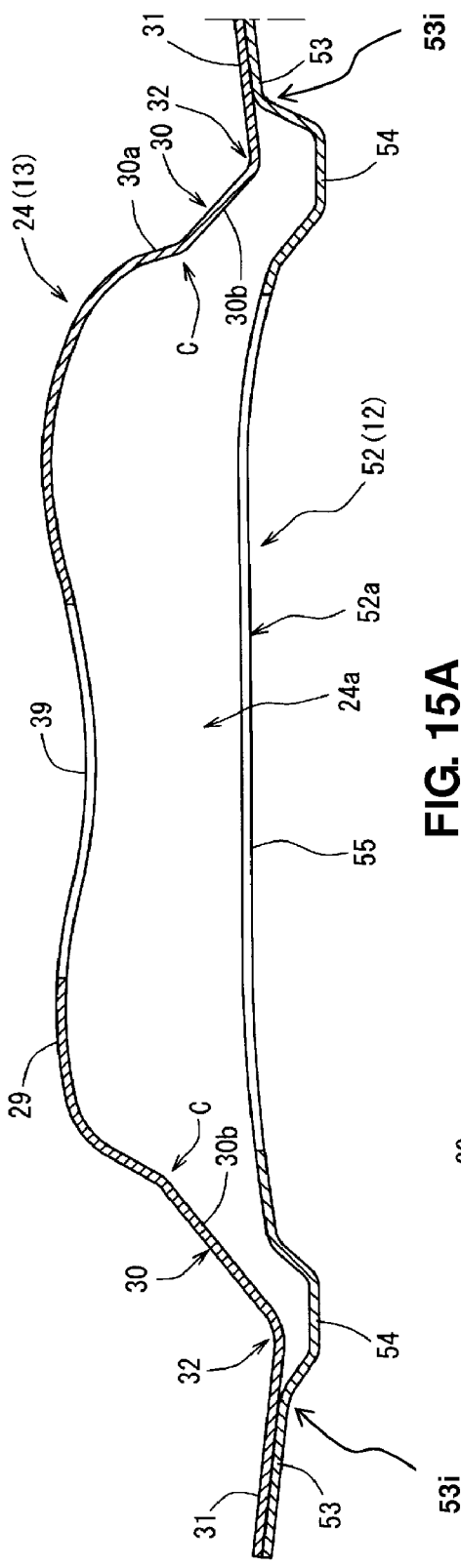
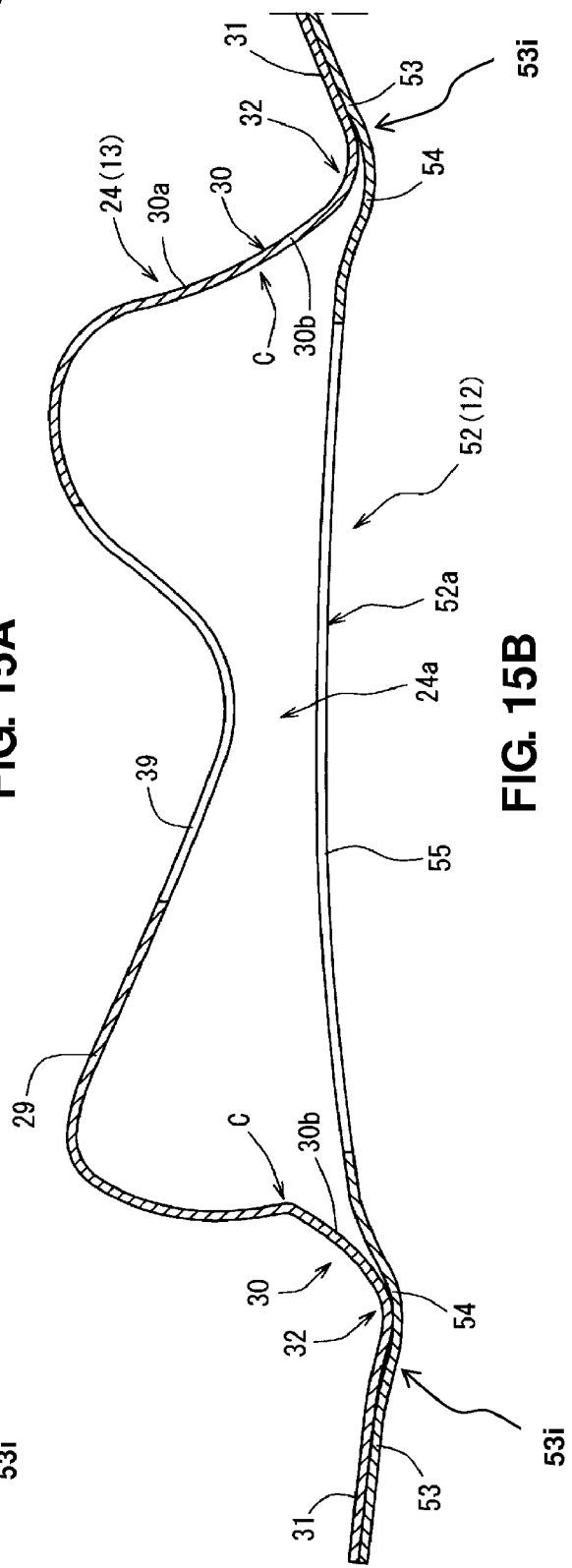
FIG. 15A
FIG. 15B

VEHICLE-BODY STRUCTURE OF VEHICLE

BACKGROUND OF THE INVENTION

The present invention relates to a vehicle-body structure equipped with a closed cross section which is formed by a first member having a U-shaped cross section and a second member which is joined to a pair of flanges of the first member at both end portions thereof and extends in a longitudinal direction thereof.

Conventionally, a structure for restraining improper deformation of a center pillar has been developed in order to secure the safety of passengers in a vehicle side collision. Japanese Patent Laid-Open Publication No. 2004-130826, for example, discloses a structure in which a weak portion is provided at a lower potion of a center pillar, whereas a full-section-plastic-moment step portion where the full section plastic moment having its center in the vehicle longitudinal direction is discontinuous is provided at an upper portion of the center pillar. Herein, a value of the full section plastic moment of a lower side of the center pillar below the full-section-plastic-moment step portion is set to be higher than a full-section-plastic-moment straight line which connects a full-section-plastic-moment value of an upper end portion of the center pillar and a full-section-plastic-moment value of a middle portion of the center pillar.

Specifically, in this structure, in addition to a normal pillar reinforcement provided between a pillar outer panel and a pillar inner panel, there is provided a second pillar reinforcement which is located over a range from the above-described moment step portion to the middle portion of the center pillar. The moment step portion is formed by a portion which corresponds to an upper end portion of this second pillar reinforcement.

According to the structure disclosed in the above-described patent publication, in the vehicle collision, both the above-described moment step portion positioned at the upper portion of the center pillar and the above-described weak portion cause bending of the center pillar, so that it can be prevented that the center pillar bends greatly at its middle portion in the vehicle vertical direction. Thereby, the bent center pillar can be properly restrained from coming into the inside of a vehicle compartment.

Meanwhile, a vehicle-body structure, such as the above-described center pillar, is equipped with a closed cross section which is formed by a first member having a U-shaped cross section and a second member which is joined to a pair of flanges of the first member at both end portions thereof and extends in its longitudinal direction.

The inventors of the present invention conducted bending analyses, in developing an appropriate vehicle-body structure which can secure the passenger's safety in the vehicle collision, for the vehicle-body structure which is equipped with the closed cross section formed by the above-described first and second members and has some portion to promote the deformation as disclosed in the above-described patent publication. Consequently, it was found that there is a concern in some cases that the first and second members joined together may be removed (detached) from each other, so that the absorption function of a vehicle-collision load with cooperation of the first and second members may deteriorate improperly.

SUMMARY OF THE INVENTION

The present invention has been devised in view of the above-described concern, and an object of the present invention is to provide a vehicle-body structure of a vehicle which can secure the proper absorption function of the vehicle collision load with cooperation of the first and second members.

According to the present invention, there is provided a vehicle-body structure of a vehicle, comprising a first member having a U-shaped cross section with an open portion at one side thereof, the first member including a pair of flanges at both ends thereof and a pair of flange-ridgeline portions which is formed at respective inside ends of the pair of flanges, and a second member joined to the pair of flanges of the first member at both end portions thereof so as to cover the open portion of the first member, wherein the vehicle-body structure has a closed cross section which is formed by the first and second members and extends in a longitudinal direction thereof, the vehicle-body structure comprises at least two parts which are formed at different positions in the longitudinal direction of the vehicle-body structure, and the first and second members of the vehicle-body structure are configured to have respective shapes in a plane which is perpendicular to the longitudinal direction of the vehicle-body structure such that, at one of the two parts of the vehicle-body structure, a distance between the pair of flange-ridgeline portions of the first member is substantially equal to a length of the second member from an inside end of one of the both end portions to an inside end of the other of the both end portions, whereas, at the above-described other of the two parts of the vehicle-body structure, a length of the second member from the inside end of one of the both end portions to the inside end of the other of the both end portions is longer than a distance between the pair of flange-ridgeline portions of the first member.

Herein, the inventors found through the analyses that a specified part of the vehicle-body structure of the above-described patent publication set to promote its bending received a greater shearing load (force) than the other part during a collision-load input. Moreover, they found that decreasing this shearing load (force) could restrain the above-described improper detachment of the first and second members, thereby improving the absorption function of the collision load with cooperation of the first and second members.

Therefore, according to the present invention described above, since the second member has its length longer than the distance between the pair of flange-ridgeline portions of the first member, a part of the second member which covers the open portion of the first member can be deformed properly in accordance with deformation of the flange flange-ridgeline portions of the first member when the vehicle-body structure receives the collision load. Thereby, the shearing load acting on a joint portion between the end portions of the second member and the flanges of the first member at the above-described other of the two parts of the vehicle-body structure can be decreased. Consequently, the proper absorption function of the vehicle collision load with the cooperation of the first and second members can be secured.

According to an embodiment of the present invention, the first and second members are joined to each other such that the pair of flange-ridgeline portions of the first member contacts the both end portions of the second member, respectively, at the above-described one of the two parts of the vehicle-body structure, whereas the inside ends of the both end portions of the second member contact specified positions of the flanges of the first member which are located outside away from the pair of flange-ridgeline portions, respectively, such that a gap is formed between the pair of flange-ridgeline portions of the first member and the second member at the above-described other of the two parts of the vehicle-body structure.

That is, by constituting that a pair of flange-ridgeline portions of the first member contacts the both end portions of the second member, respectively, at the above-described one of the two parts of the vehicle-body structure, the distance between the pair of flange-ridgeline portions of the first member is set be substantially equal to the length of the second member from the inside end of one of the both end portions to the inside end of the other of the both end portions. Meanwhile, by constituting that the inside ends of the both end portions of the second member contact specified positions of the flanges of the first member which are located outside away from the pair of flange-ridgeline portions, respectively, such that the gap is formed between the pair of flange-ridgeline portions of the first member and the second member at the above-described other of the two parts of the vehicle-body structure, the length of the second member from the inside end of one of the both end portions to the inside end of the other of the both end portions is set to be longer than the distance between the pair of flange-ridgeline portions of the first member. Thereby, it can be prevented that the second member is pressed inwardly, in the vehicle width direction, by the flange-ridgeline portions of the first member quickly in an initial stage of deformation of the vehicle-body structure. Accordingly, the shearing load acting on the joint portion between the end portions of the second member and the flanges of the first member can be decreased properly.

According to another embodiment of the present invention, the second member includes beads which are concaved toward an opposite side to the first member at specific positions thereof which face to the pair of flange-ridgeline portions of the first member. Thereby, a large area can be secured at a plane portion of the second member except for the beads. Accordingly, an appropriate load resistance of the second member against a pull load which is generated when the first member is deformed can be secured by the above-described plane portion of the second member, and the shearing load can be decreased by extension of the beads.

According to another embodiment of the present invention, the first member has a rigidity which is higher than that of the second member. Thereby, the above-described decrease effect of the shearing load can be obtained effectively.

According to another embodiment of the present invention, the vehicle-body structure is a center pillar of the vehicle, the longitudinal direction of the vehicle-body structure corresponds to a vertical direction of the vehicle, the first member is a reinforcement of the center pillar, and the second member is an inner panel of the center pillar which is arranged on an inward side, in a vehicle width direction, of the first member. Thereby, since the center pillar of the vehicle which tends to receive the collision load in the vehicle side collision has the above-described structure according to the present invention, passengers can be securely protected from the collision load in the vehicle side collision.

According to another embodiment of the present invention, the above-described one of the two parts of the vehicle-body structure is an upper portion of the center pillar, and the above-described other of the two parts of the vehicle-body structure is a lower portion of the center pillar. Thereby, the appropriate load resistance of the upper portion of the center pillar against the side-collision load can be secured, and the appropriate promotion of deformation of the lower part of the center pillar and the decrease of shearing load can be achieved.

According to another embodiment of the present invention, the first member further comprises a pair of vertical-wall portions which extends continuously from the pair of flanges via the pair of flange-ridgeline portions, at least one of the vertical-wall portions of the first member includes a slant portion which has a specified slant angle such that the vertical-wall portion stands up gradually from the flange portion, and the first member is configured such that the specified angle of the slant portion of the first member at the lower portion of the center pillar is gentler than that of the first member at the upper portion of the center pillar. Thereby, when a force acing inwardly, in the vehicle width direction, is applied to the lower part of the center pillar in the vehicle side collision, the above-described vertical-wall portion is easily deformed so as to fall down, so that crushing of the lower part of the center pillar can be promoted. Meanwhile, the upper part of the center pillar including the upper portion and middle portion of the reinforcement has the vertical-wall portion which is not so gentle, compared with the lower part of the center pillar. Thus, the appropriate load resistance of the upper part of the center pillar against the load acting in the vehicle width direction can be secured properly. Consequently, when the side-collision load acts on the center pillar inwardly, the lower portion of the center pillar including the lower part is deformed greatly first, so that an impact energy of the vehicle side collision can be absorbed by this deformed portion. Meanwhile, the upper portion and the middle portion of the center pillar which includes the upper part having the relatively-high load resistance can be effectively restrained from being deformed. Thus, a situation where the center pillar bends greatly at its middle portion and thereby comes into the inside of the vehicle compartment is prevented, so that any improper interference of the bending center pillar with passengers can be avoided effectively.

According to another embodiment of the present invention, the vertical-wall portion of the first member comprises a base portion which extends substantially in the vehicle width direction and a corner portion which is formed between the base portion and the slant portion. Since the vertical-wall portion of the lower portion of the center pillar bends easily at this corner portion where the stress concentrates in the vehicle side collision and falls down toward the inside of the vehicle (toward the pillar-inner-panel side), the deformation of the lower portion of the center pillar including the above-described lower part can be promoted effectively. Accordingly, the bending of the middle portion of the center pillar is prevented, and thereby the passenger's protection can be achieved securely.

According to another embodiment of the present invention, a hinge attachment portion of a rear door is provided at the upper portion of the center pillar. Thereby, since the rear door is supported at the upper portion of the center pillar having the high load resistance via the door hinge, the support rigidity of the rear door can be increased effectively.

According to another embodiment of the present invention, a hinge attachment portion of a rear door is provided at the center pillar, and a bending promotion portion to cause bending of the center pillar when the center pillar receives a load of vehicle side collision is formed at a specified position of the reinforcement which is located above the hinge attachment portion. Thereby, since the center pillar tends to bend at the bending promotion portion in accordance with the collision load inputted from a lower door hinge, bending of the middle portion of the center pillar can be more securely prevented. Consequently, any improper interference of the bending center pillar with passengers can be avoided more effectively.

According to another embodiment of the present invention, the first member is a press member which is formed through a thermal pressing. Thereby, the center pillar can be reinforced without increasing its weight, so that the middle portion of the center pillar can be more securely prevented from bending in the vehicle side collision.

Other features, aspects, and advantages of the present invention will become apparent from the following description which refers to the accompanying drawings.

BRIEF DESCRIPTION OF THE DRAWINGS

FIG. 15A is a sectional view of a lower portion of the center pillar which explains an initial stage of bending of the center pillar; FIG. 15B is a sectional view of the lower portion of the center pillar which explains a late stage of bending of the center pillar.

DETAILED DESCRIPTION OF THE INVENTION

Hereinafter, a preferred embodiment of the present invention and its modifications will be described referring to the accompanying drawings.

Figure 1:
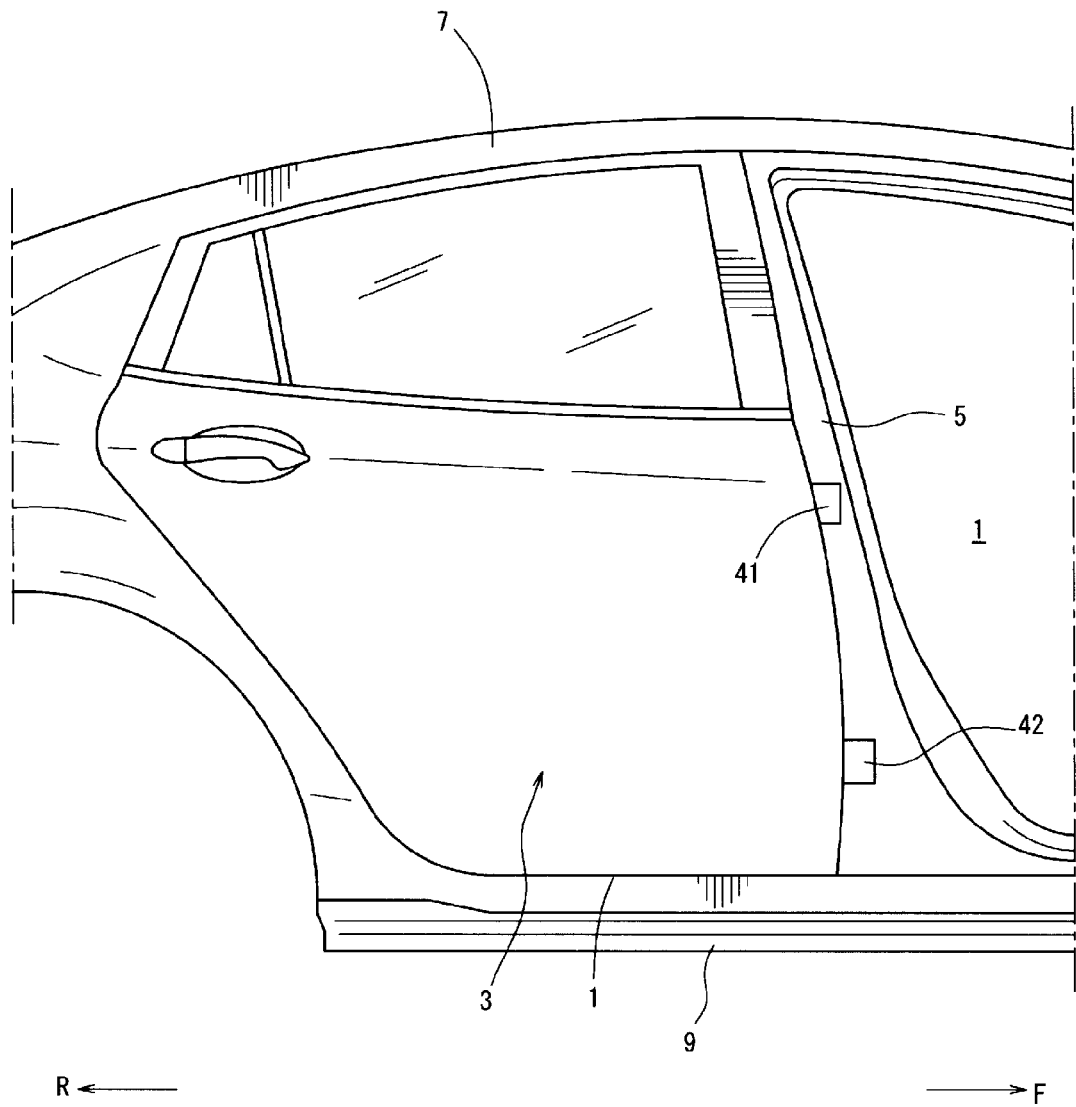
FIG. 1 is a side view showing a vehicle side portion equipped with a center pillar, as a vehicle-body structure, according to an embodiment of the present invention.
Figure 2:
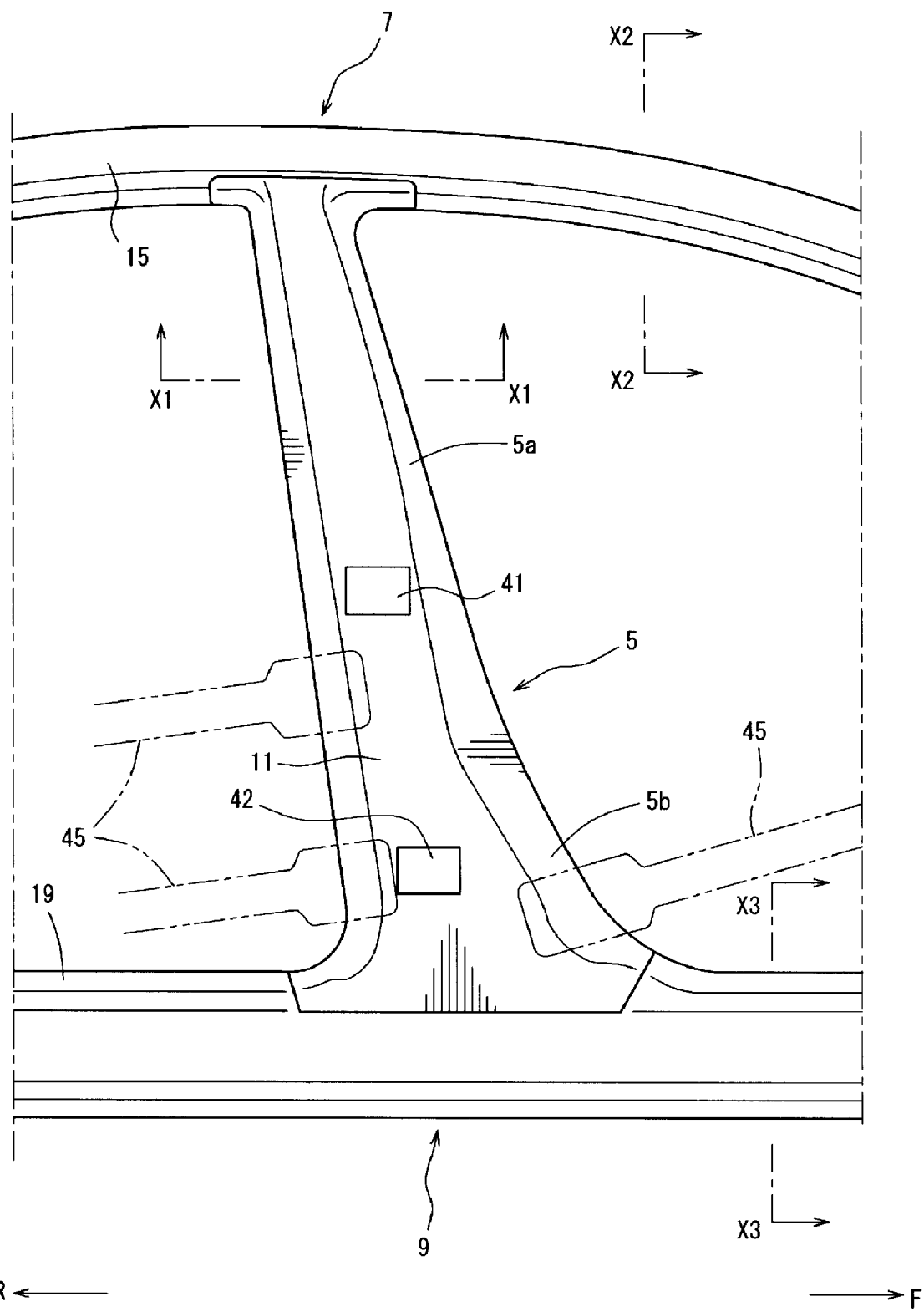
FIG. 2 is a side view of the vehicle side portion showing a state in which a side door is removed, when viewed from an outward side in a vehicle width direction, which is an enlarged view of a major part of FIG. 1.

FIGS. 1 and 2 show a vehicle side portion according to an embodiment of the present invention. An ingress and egress opening 1 is formed at a side face portion of a vehicle shown in the figures, which is closable with a side door 3 (FIG. 1). In the figures, an arrow F shows a vehicle forward direction, an arrow R shows a vehicle rearward direction, an arrow IN shows a vehicle inward direction, and an arrow OUT shows a vehicle outward direction.

A four-door sedan type of automotive vehicle is shown in FIGS. 1 and 2, and two ingress and egress openings 1 are formed at two positions in front and back of a center pillar 5 which will be described below. A couple of side doors 3 closes and opens these openings 1. Herein, an illustration of a front side door is omitted in FIG. 1, and the side door 3 illustrated shown here is a rear side door for a rear opening 1.

At the side portion of the vehicle are provided a roof side rail 7 and a side sill 9 which extend in the vehicle longitudinal direction, which form an upper side and a lower side of the above-described ingress and egress opening 1. Respective central portions of the roof side rail 7 and the side sill 9 are connected with a center pillar 5 which extends in a vehicle vertical direction. Herein, a member shown by a two-dotted broken line, which is denoted by reference numeral 45 in FIG. 2, is an impact bar as a reinforcing member which is provided inside the side door 3.

Figure 3:
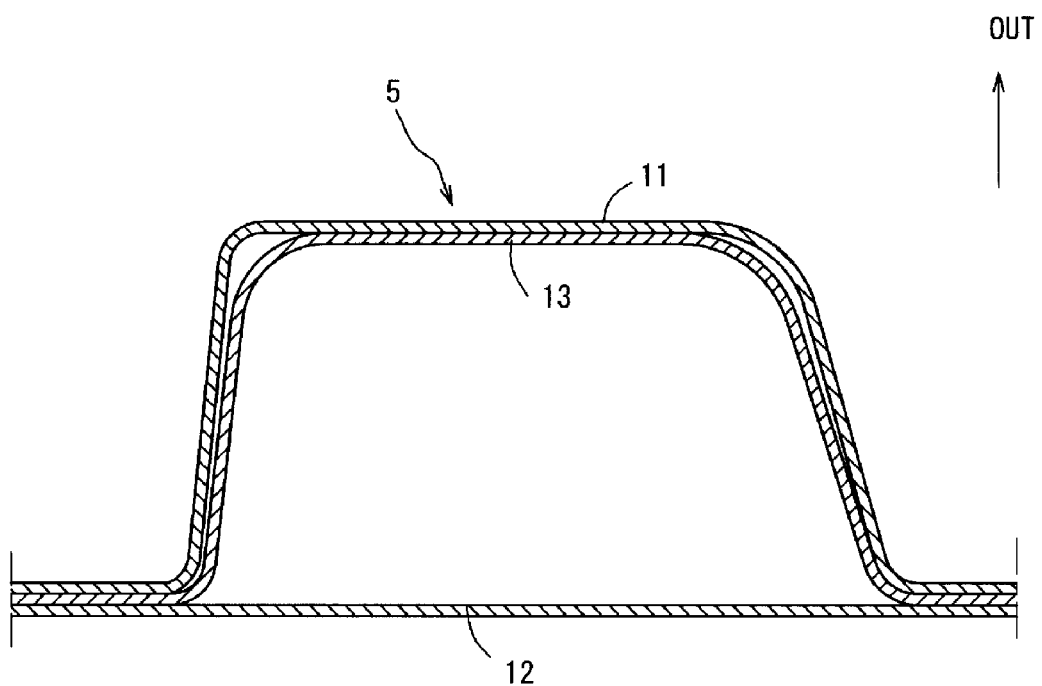
FIG. 3 is a sectional view taken along line X1-X1 of FIG. 2.
Figure 4:
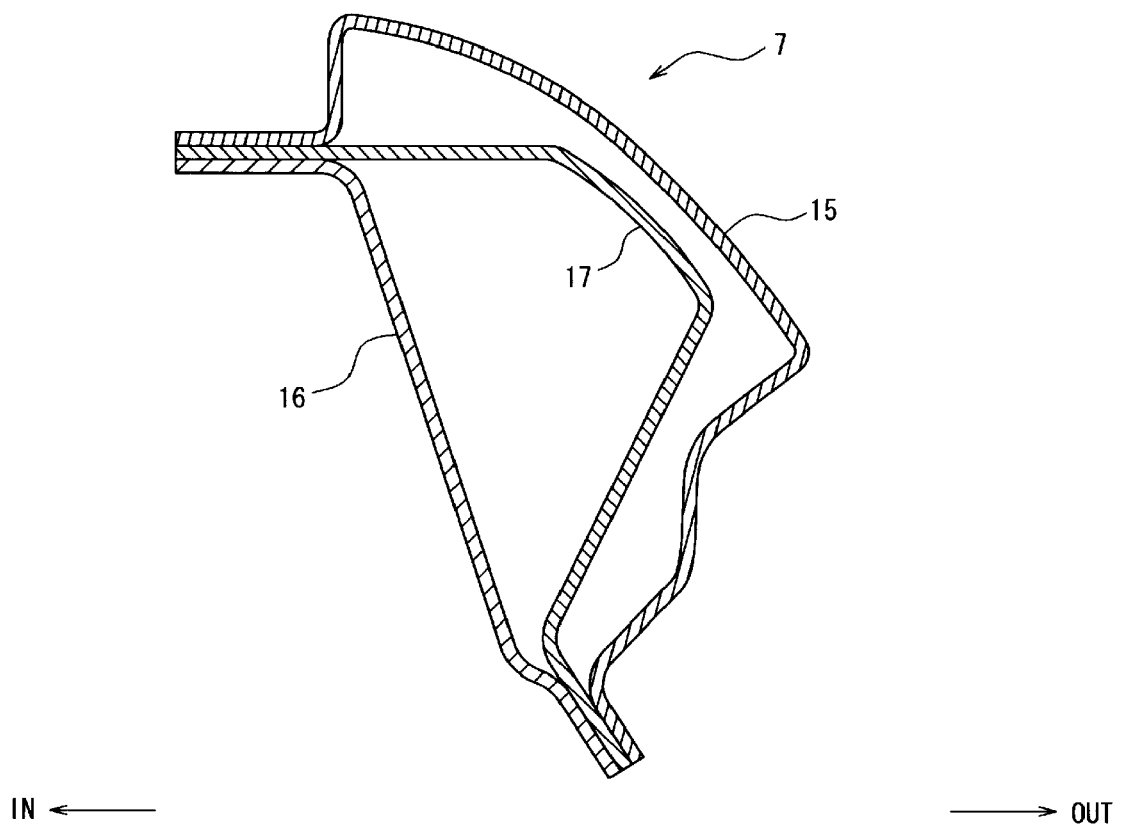
FIG. 4 is a sectional view taken along line X2-X2 of FIG. 2.
Figure 5:
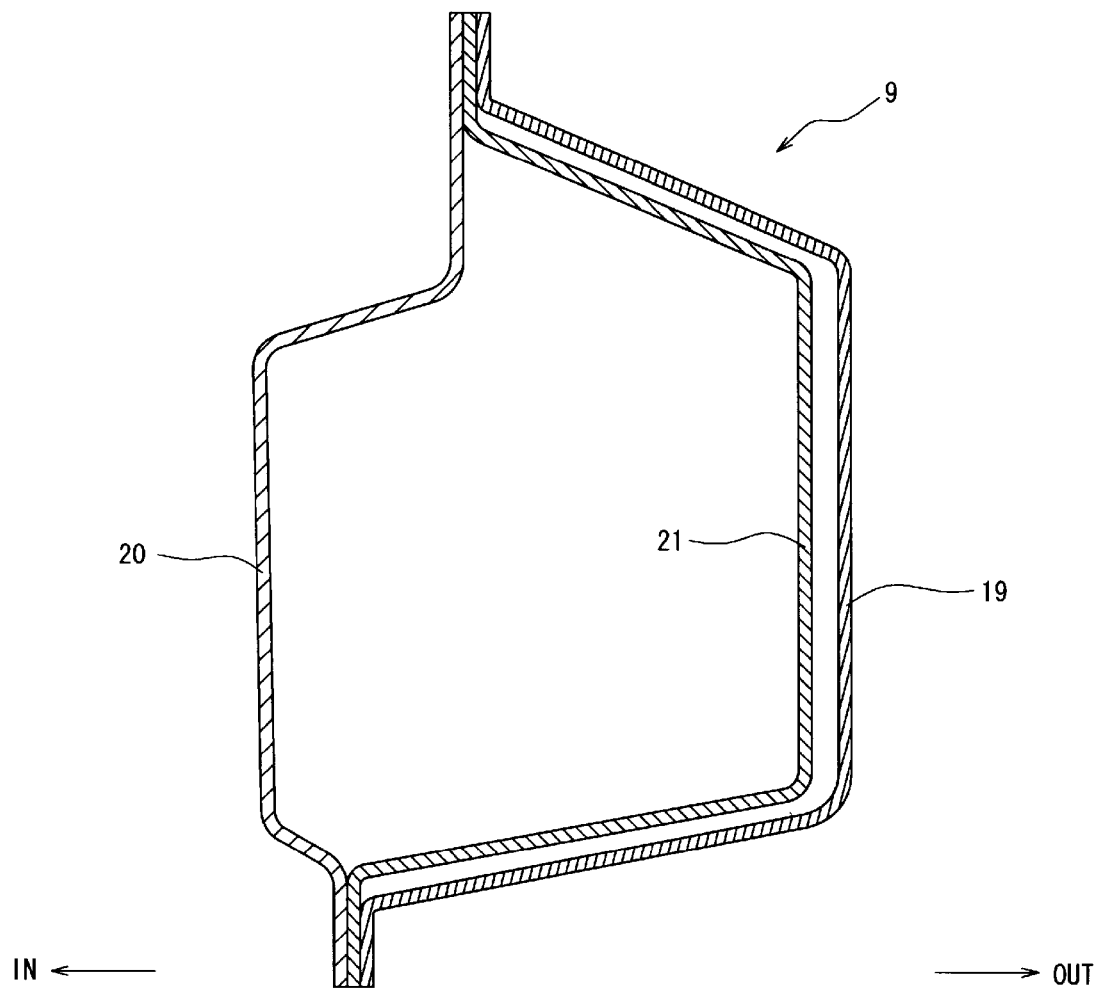
FIG. 5 is a sectional view taken along line X3-X3 of FIG. 2.

FIGS. 3, 4 and 5 are sectional views of the above-described center pillar 5, roof side rail 7, and side sill 9. The center pillar 5 comprises, as shown in FIG. 3, a pillar outer panel 11, a pillar inner panel 12 which is arranged on an inward side, in a vehicle width direction, of the pillar outer panel 11, and a pillar reinforcement 13 which is arranged between the panels 11, 12. Likewise, the roof side rail 7 comprises, as shown in FIG. 4, an outer panel 15, an inner panel 16, and a reinforcement 17. The side sill 9 comprises, as shown in FIG. 5, an outer panel 19, an inner panel 20, and a reinforcement 21.

Herein, the pillar reinforcement 13 of the center pillar 5 is made of a thicker or stronger plate member so that it has a rigidity which is higher than that of the pillar inner panel 12.

Figure 6:
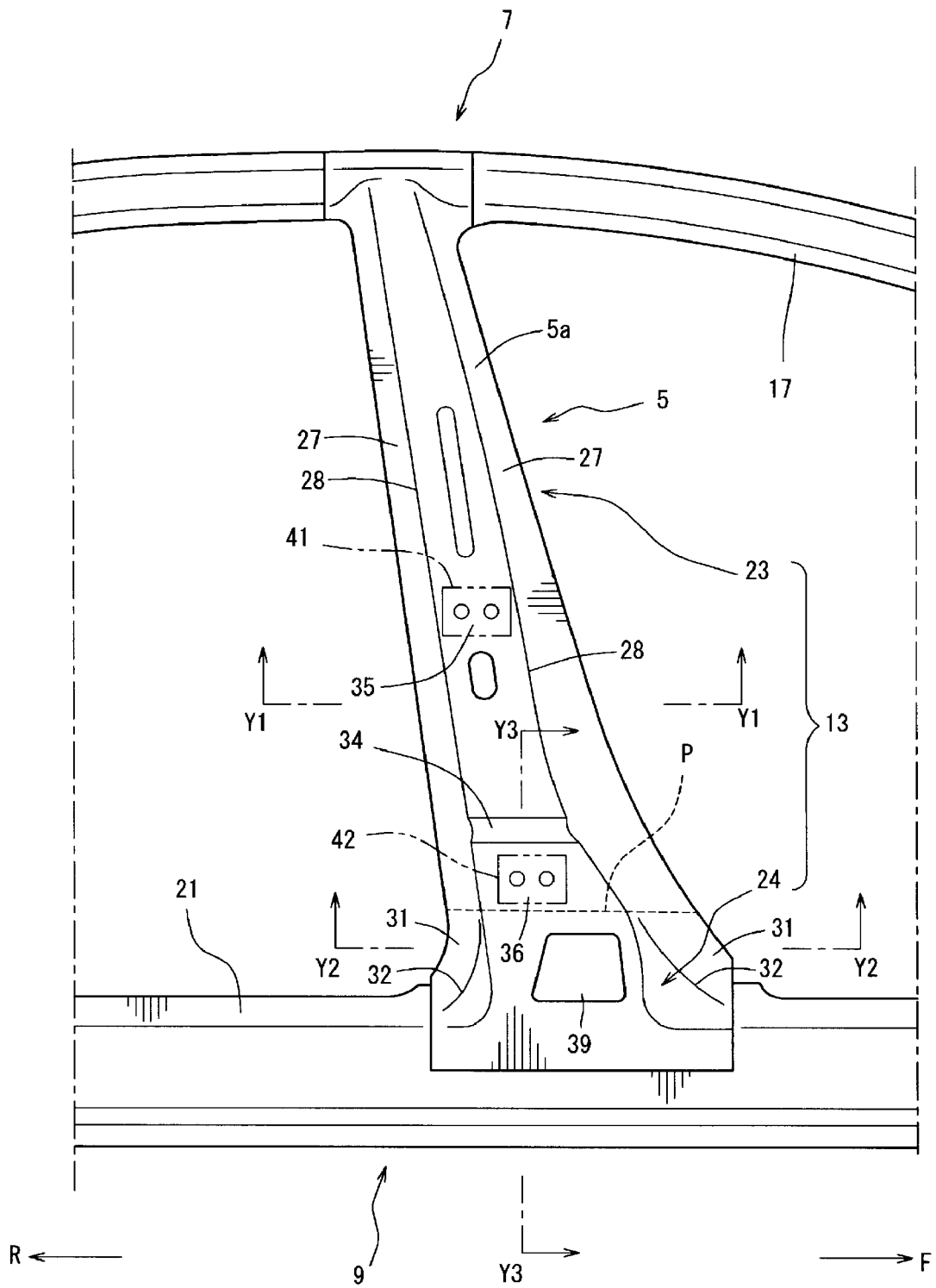
FIG. 6 is a side view of the vehicle side portion showing a state in which respective outer panels of a center pillar, a roof side rail, and a side sill are removed.

FIG. 6 is a view corresponding to FIG. 2 and showing a state in which the above-described pillar outer panel 11 of the center pillar 5, outer panel 15 of the roof side rail 7, and outer panel 19 of the side sill 9 are removed. Accordingly, in FIG. 6 the respective pillar reinforcements 13, 17, 21 of the center pillar 5, roof side rail 7, and side sill 9 are illustrated so as to be exposed to the outside, which is different from FIG. 2.

In the present embodiment, the center pillar 5 comprises an upper part 5a and a lower part 5b, as described later, which are separated by shapes of the pillar inner panel 12 and the pillar reinforcement 13. As illustrated in FIG. 6, while the pillar reinforcement 13 of the center pillar 5 is comprised of an integral press member which is formed through pressing, it is separated into an upper portion 23 which constitutes the upper part 5a and a lower portion 24 which constitutes the lower part 5b by differences in a shape of their cross section. Reference character P in the figure denotes a border line to separate the upper portion 23 and the lower portion 24, and this border line P is positioned below a middle portion of the pillar reinforcement 13 in the vehicle vertical direction. That is, the pillar reinforcement 13 includes integrally the upper portion 23 above the border line P and the lower portion 24 below the border line P.

Figure 7:
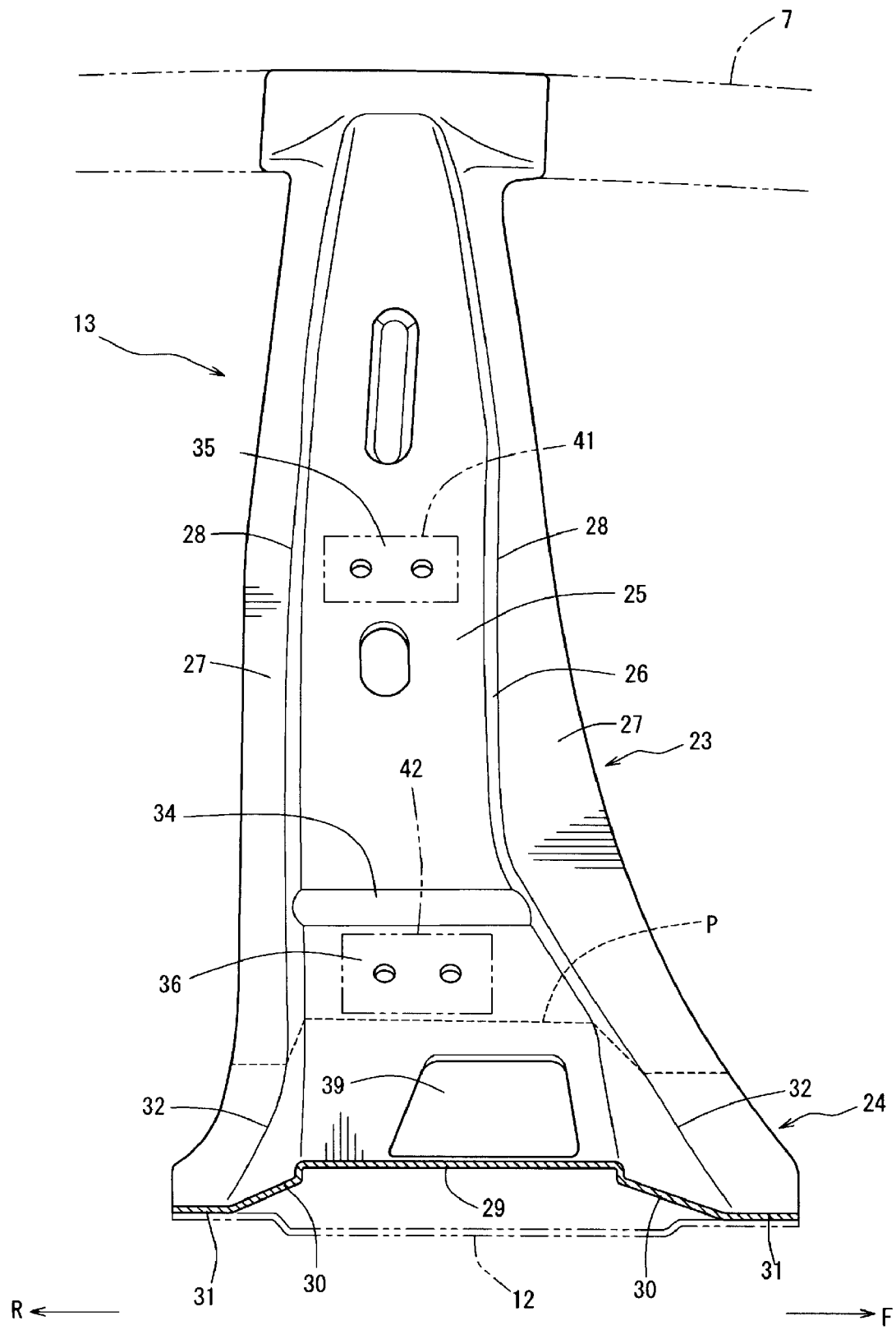
FIG. 7 is a perspective view of a pillar reinforcement itself which is partially cut away.
Figure 8:
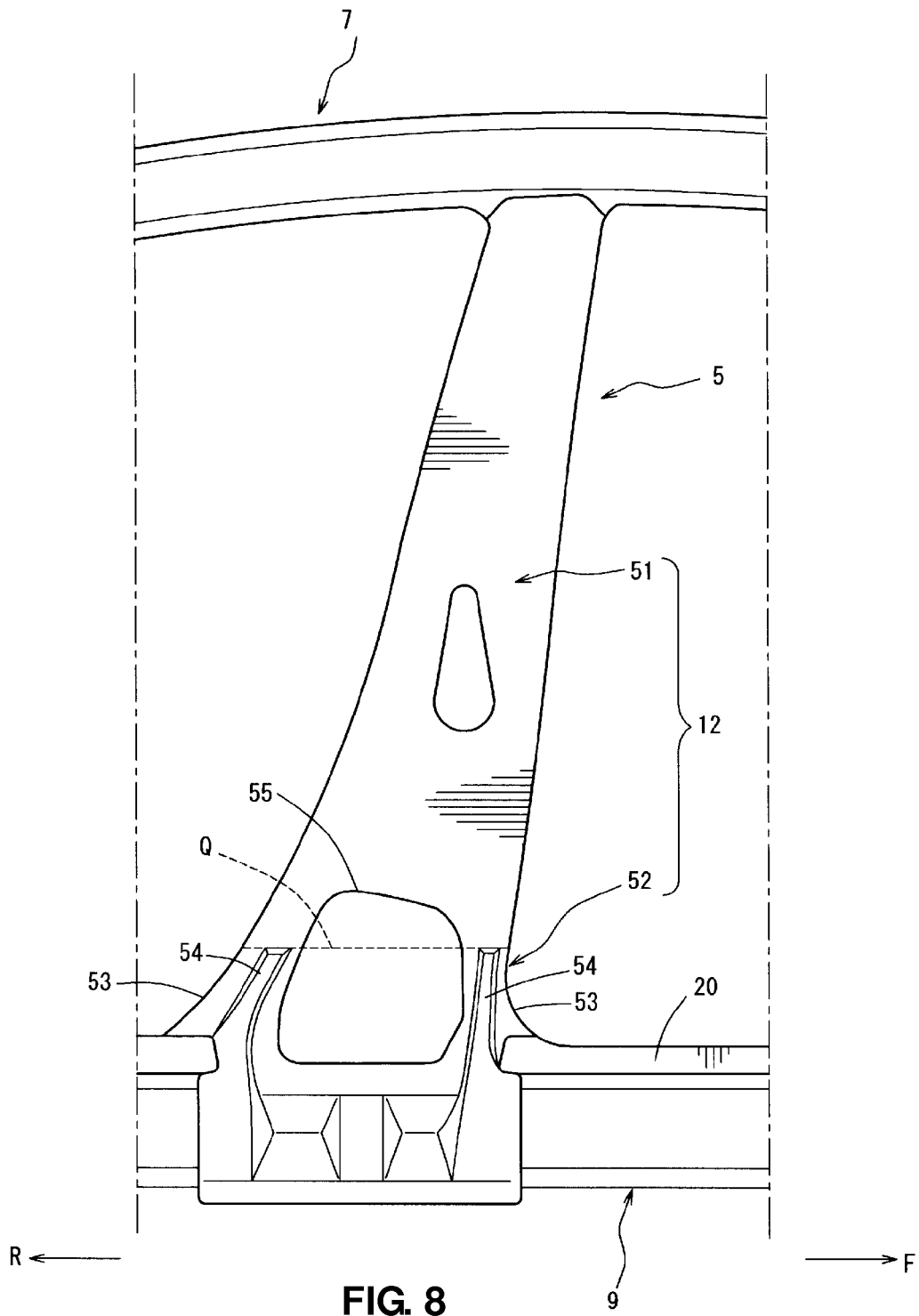
FIG. 8 is a side view of a pillar inner panel, when viewed from an inward side in the vehicle width direction.
Figure 9:
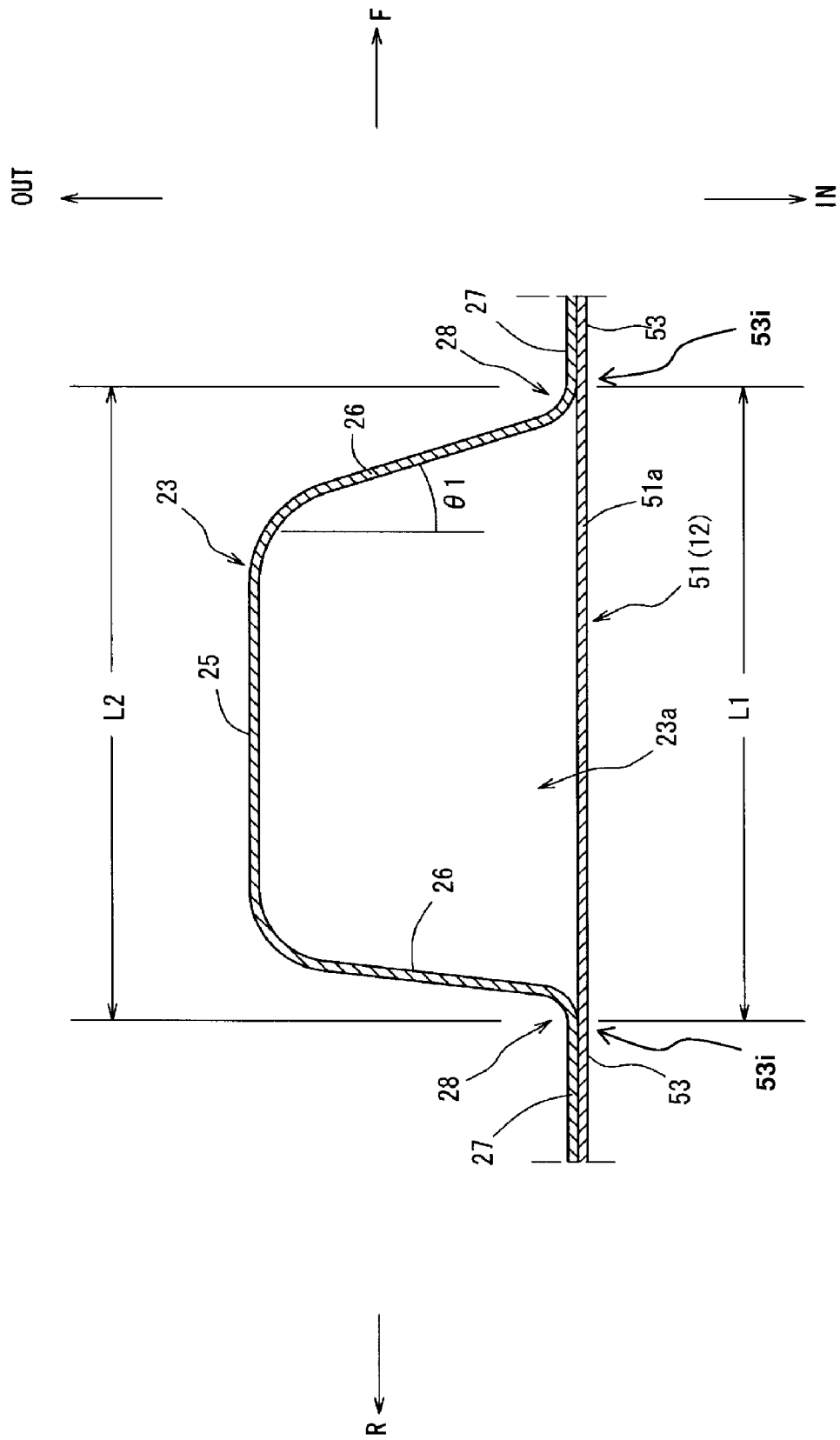
FIG. 9 is a sectional view taken along line Y1-Y1 of FIG. 6.
Figure 10:
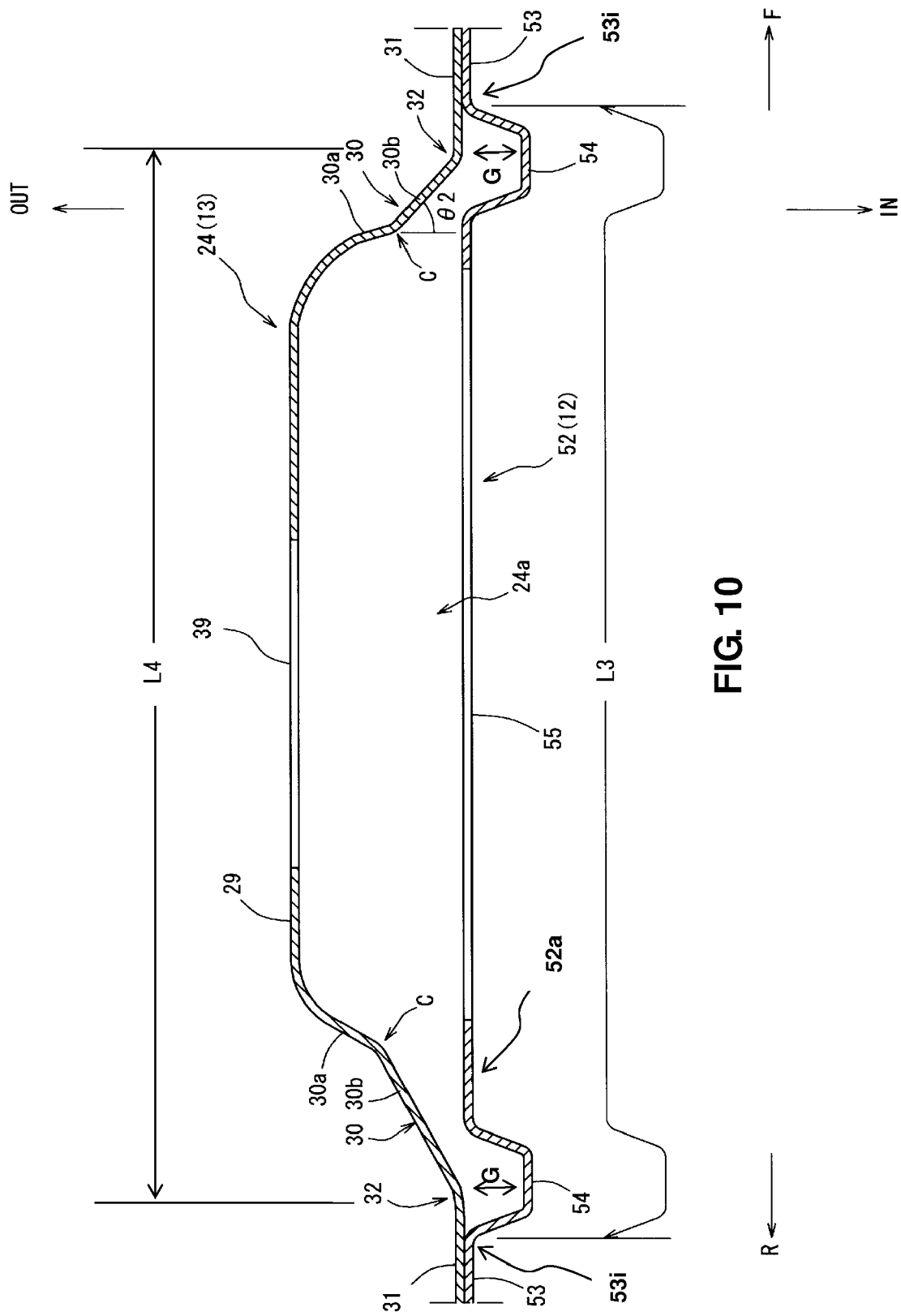
FIG. 10 is a sectional view taken along line Y2-Y2 of FIG. 6.

FIG. 7 is a perspective view of the pillar reinforcement 13 which is partially cut away. FIG. 8 is a side view of the pillar inner panel, when viewed from the inward side in the vehicle width direction. FIGS. 9 and 10 are respective sectional views of the upper portions 23, 51 and the lower portions 24, 52 of the pillar inner panel 12 and the pillar reinforcement 13, taken along lines Y1-Y1 and Y2-Y2 of FIG. 6, respectively. As shown in FIGS. 7 and 9, the upper portion 23 comprises a side-wall portion 25 which extends along the side face of the vehicle body, a pair of vertical-wall portion 26 which extends inwardly, in the vehicle width direction, from both end portions of the side-wall portion 25, and a pair of flanges 27 which extends longitudinally from tip portions of the vertical-wall portions 26 and are joined to the pillar inner panel 12 of the center pillar 5. The pair of vertical-wall portions 26 extends inwardly, in the vehicle width direction, having an inclination angle θ1 (see FIG. 9), which is about the right angle 90°, relative to the side-wall portion 25. The vertical-wall portions 26, side-wall portion 25 and flanges 27 form a U-shaped cross section of the pillar reinforcement 13.

At the upper portion 23 of the pillar reinforcement 13 are provided flange-ridgeline portions 28 of the flanges 27 which are formed by the vertical-wall portions 26 and inside end portions of the flanges 27.

Further, at the upper portion 23, as shown in FIG. 9, is formed an open portion 23a between the pair of flange-ridgeline portions 28.

Meanwhile, as shown in FIGS. 7 and 10, the lower portion 24 of the pillar reinforcement 13 has a wider shape than the above-described upper portion 23. Specifically, the lower portion 24 comprises a side-wall portion 29 which extends along the side face of the vehicle body, a pair of vertical-wall portion 30 which extends inwardly in the vehicle width direction with a slant from both end portions of the side-wall portion 29, and a pair of flanges 31 which extends longitudinally from tip portions of the vertical-wall portions 30 and are joined to the pillar inner panel 12 of the center pillar 5. Further, at the lower portion 24, as shown in FIGS. 6, 7 and 10, is formed a relatively wide opening (through hole) 39 at the side-wall portion 29.

At the lower portion 24 of the pillar reinforcement 13 are provided flange-ridgeline portions 32 at inside end portions of the flanges 31 which are formed by the vertical-wall portions 30 and the flanges 31.

Further, at the lower portion 24, as shown in FIG. 10, is formed an open portion 24a which opens inwardly, in the vehicle width direction, between the pair of flanges 31, 31.

The pair of vertical-wall portions 30 of the lower portion 24 slants so as to enlarge their distance gradually (i.e., each of the portions 30 extends obliquely outside), and their inclination angle θ2 (see FIG. 10) is set to be greater than that of the vertical-wall portions 26 of the upper portion 23 (FIG. 9). That is, the vertical-wall portions 26 of the upper portion 23 slants with the angle θ1 which is a very small angle relative to the vehicle width direction, whereas the vertical-wall portions 30 of the lower portion 24 slants with the angle θ2 which is greater (i.e., gentler) than the angle θ1 relative to the vehicle width direction.

More specifically, each of the vertical-wall portions 30 of the lower portion 24 comprises, as shown in FIG. 10, a base portion 30a which extends inwardly from the end portion of the side-wall portion 29 and a slant portion 30b which extends obliquely. A corner portion C is formed between the base portion 30a and the slant portion 30b.

Herein, the thickness of the lower portion 24 including the vertical-wall portion 30 is set to be smaller than that of the upper portion 23.

As shown in FIGS. 1 and 2, a pair of door hinges 41, 42 to support the rear side door 3 is attached to the center pillar 5. In FIGS. 6 and 7, specified portions of the pillar reinforcement 13 to which the door hinges 41, 42 are attached are denoted by reference numerals 35, 36. As apparent from these figures, the hinge attachment portions 35, 36 are provided at the upper portion 23 of the pillar reinforcement 13, and such hinge attachment portions are not provided at the lower portion 24.

The hinge attachment portion 36 (hereinafter, referred to as "lower hinge attachment portion 36"), to which the lower door hinge 42 is attached, is arranged near a lower end portion of the upper portion 23, that is, at a position which is located slightly above the border line P between the upper portion 23 and the lower portion 24. Meanwhile, the hinge attachment portion 35 (hereinafter, referred to as "upper hinge attachment portion 35"), to which the upper door hinge 41 is attached, is arranged near a middle portion of the upper portion 23, that is, at a position which is located above the lower hinge attachment portion 36 by a specified distance.

As illustrated in FIG. 8, while the pillar inner panel 12 of the center pillar 5 is comprised of an integral press member which is formed through pressing, it is separated into an upper portion 51 which constitutes the upper part 5a and a lower portion 52 which constitutes the lower part 5b by differences in a shape of their cross section, like the pillar reinforcement 13. Reference character Q in the figure denotes a border line which is positioned at a location of the pillar inner panel 12 which corresponds to the border line P separating the upper portion 23 and the lower portion 24, of the pillar reinforcement 13, that is, at a location below the middle portion of the pillar inner panel 12.

That is, the pillar inner panel 12 includes integrally the upper portion 51 above the border line Q and the lower portion 52 below the border line Q.

The upper portion 51 of the pillar inner panel 12 is formed in a substantially flat shape, and both end portions 53, 53 of the pillar inner panel 12 are joined to the flanges 27 of the upper portion 23 of the pillar reinforcement 13 (see FIG. 9). In the figure, reference character 53i denotes an inside end of the end portion 53 of the pillar inner panel 12.

The upper portion 51 at the upper part 5a of the center pillar 5 is formed in the flat shape as described, so that the length L1 of a portion 51a of the pillar inner panel 12 which covers the opening portion 23a between the flange-ridgeline portions 28, 28, that is, the length L1 of the pillar inner panel 12 from the inside end 53i of one of the end portions 53 to the inside end 53i of the other of the end portions 53 is substantially equal to the distance L2 between the flange-ridgeline portions 28, 28 as shown in FIG. 9.

Further, at the upper portion 5a, the upper portion 23 of the pillar reinforcement 13 is joined to the upper portion 51 of the pillar inner panel 12 such that the flange-ridgeline portions 28 contact the pillar inner panel 12. Herein, a situation meant by a term of "contact" includes not only a state of direct contacting of the flange-ridgeline portions 28 and the pillar inner panel 12 at a normal condition, but another state in which the flange-ridgeline portions 28 come to contact the pillar inner panel 12 directly through deformation of these 28, 12 in an initial stage of the vehicle side collision.

Meanwhile, the both end portions 53, 53 of the lower portion 52 of the pillar inner panel 12 are joined to the flanges 31, 31 (see FIG. 10) of the lower portion 24 of the pillar reinforcement 13. Thus, the lower portion 52 of the pillar inner panel 12 covers the opening portion 24a of the lower portion 24 of the pillar reinforcement 13 from the inward side in the vehicle width direction.

Further, two beads 54, 54 which are concaved outwardly, in the vehicle width direction, are formed at the lower portion 52 of the pillar inner panel 12. The beads 54 extend in the vehicle vertical at the lower portion 52, and as shown in FIG. 10, they are formed at specific positions of the lower portion 52 which face to the pair of flange-ridgeline portions 32 of the pillar reinforcement 13.

The bead 54 generates a gap G which is formed between the flange-ridgeline portion 32 of the lower portion 24 of the pillar reinforcement 13 and the lower portion 52 of the pillar inner panel 12. That is, the inside ends 53i of the both end portions 53 of the lower portion 52 of the pillar inner panel 12 contact specified positions of the flanges 31 of the lower portion 24 of the pillar reinforcement 13 are located outside away from the pair of flange-ridgeline portions 32, respectively, such that the gap G is formed between the flange-ridgeline portions 32 of the lower portion 24 of the pillar reinforcement 13 and the lower portion 52 of the pillar inner panel 12.

Accordingly, the length L3 of the portion 52a, which covers the opening portion 24a of the pillar reinforcement 13, of the lower portion 52 of the pillar inner panel 12, that is, the length L3 of the lower portion 52 of the pillar inner panel 12 from the inside end 53i of one of the end portions 53 to the inside end 53i of the other of the end portions 53, is longer than the distance L4 between the pair of flange-ridgeline portions 32 of the lower portion 24 of the pillar reinforcement 13, as shown in FIG. 10.

Further, the lower portion 52 of the pillar inner panel 12 has an opening (through hole) 55 which is formed between the two beads 54, 54 as shown in FIGS. 8 and 10. This opening 55 is positioned at a specified location which substantially corresponds to the opening 39 of the pillar reinforcement 13.

Figure 11:
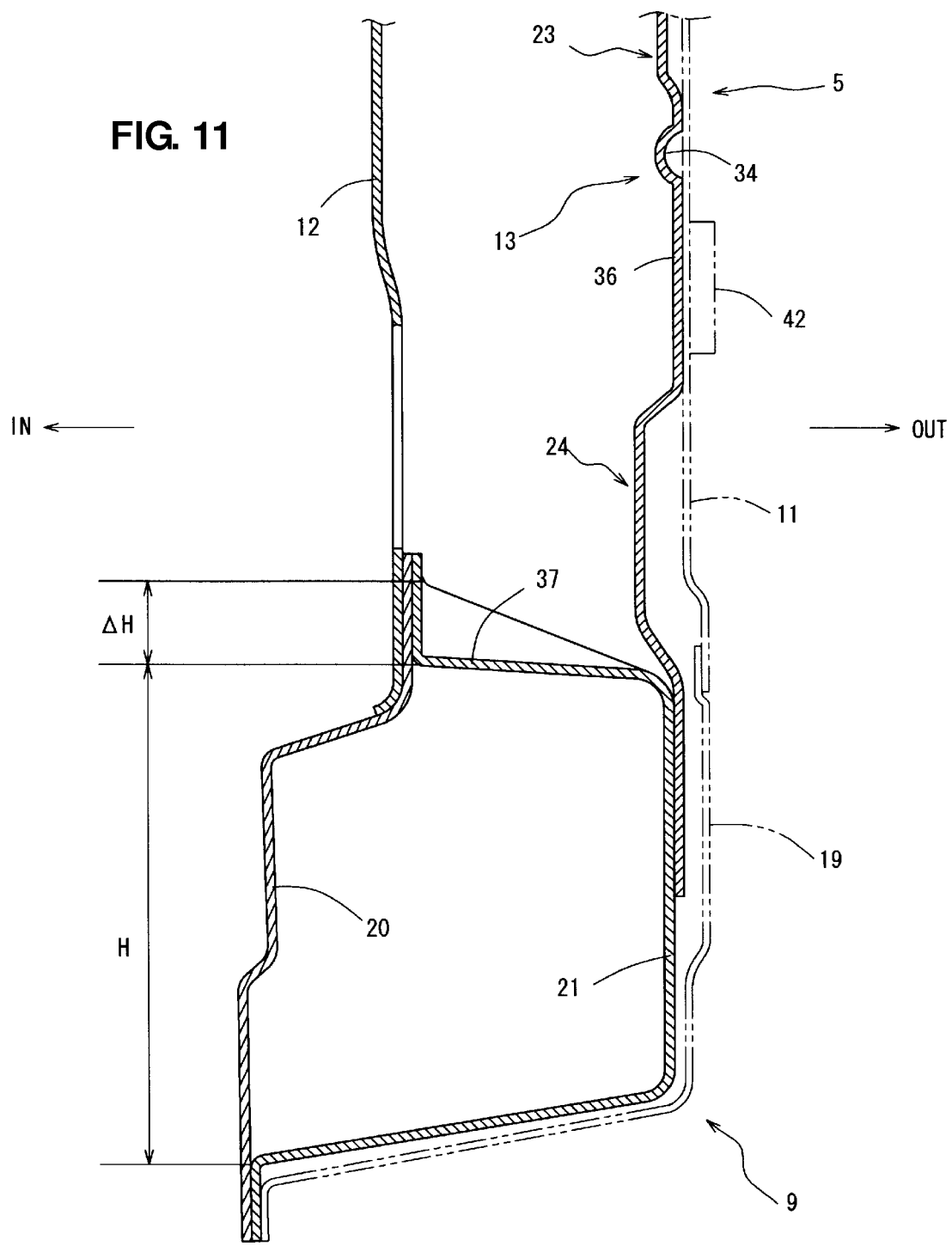
FIG. 11 is a sectional view taken along line Y3-Y3 of FIG. 6.

FIG. 11 is a sectional view taken along line Y3-Y3 of FIG. 6. In this figure, the respective pillar outer panels 11, 19 of the center pillar 5 and the side sill 9 are illustrated by two-dotted broken lines. As shown in this figure, the upper portion 23 of the pillar reinforcement 13 is arranged close to the pillar outer panel 11 in the vehicle width direction at the above-described lower hinge attachment portion 36, and these members are overlapped. The above-described lower door hinge 42 is attached to this overlap portion of the members via bolts, not illustrated. In other words, this lower door hinge 42 is attached to the lower hinge attachment portion 36 of the pillar reinforcement 13 in a state in which the pillar outer panel 11 is arranged between these members 42, 36. Herein, the upper door hinge 41 is also attached to the upper hinge attachment portion 35 in the same way, which is not illustrated in detail.

Further, as shown in FIGS. 6, 7 and 11, a groove with an arc-shaped cross section 34 which is concaved inwardly and extends in the vehicle longitudinal direction is formed at a specified position of the upper portion 23 which is located near a lower end of the upper portion 23 and slightly above an upper end portion of the above-described lower hinge attachment portion 36. This concaved groove 34, which corresponds to a bending promotion portion of the present invention, causes the bending deformation of the center pillar 5 in the vehicle side collision.

Figure 12:
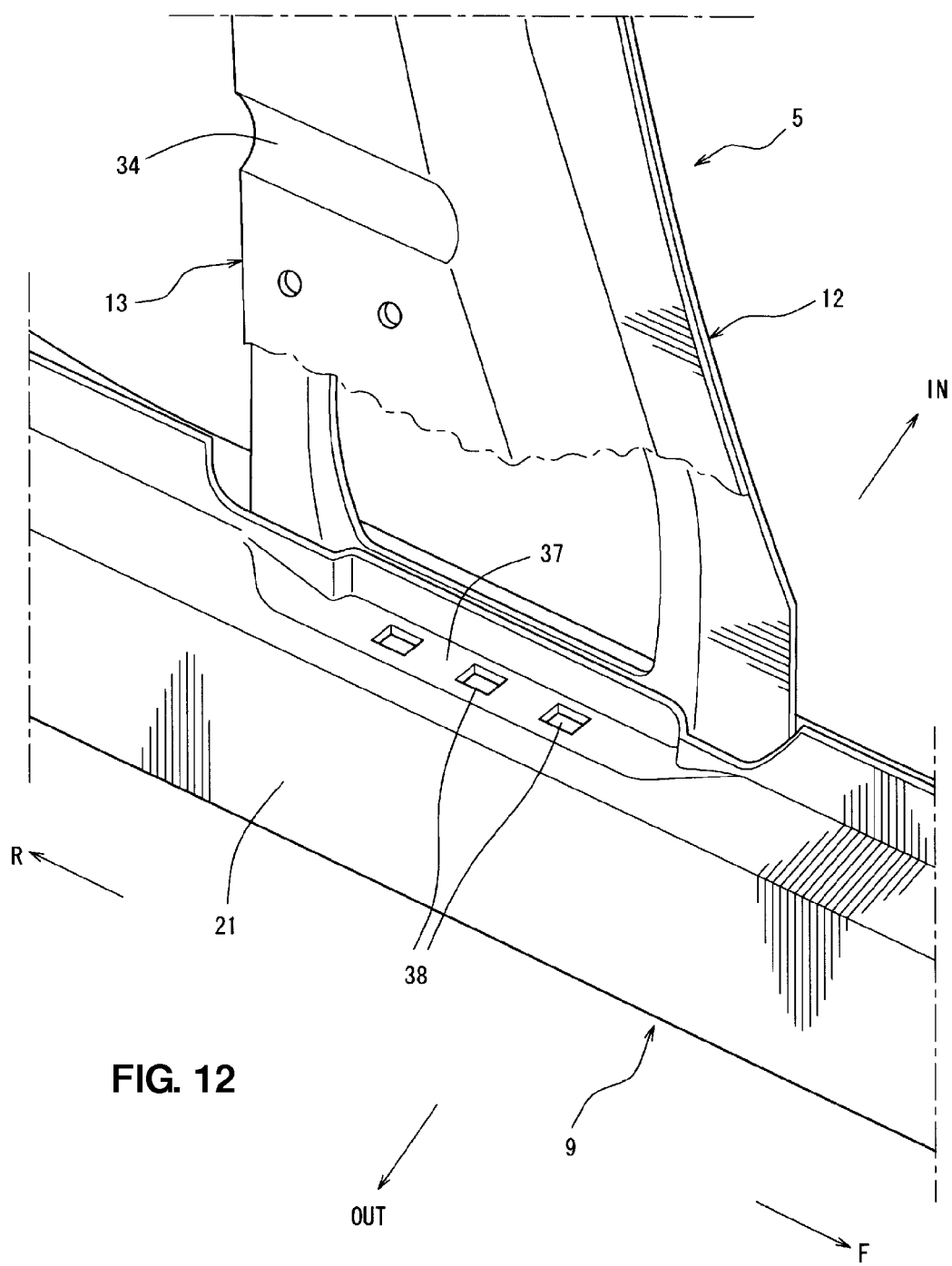
FIG. 12 is a perspective view showing around a joint portion between the center pillar and the side sill.

FIG. 12 is a perspective view showing around a joint portion between the center pillar 5 and the side sill 9. Herein, like FIG. 6, this figure illustrates this joint portion in a state where the respective outer panels 11, 19 of the center pillar 5 and the side sill 9 are removed, and large part of the lower portion 24 of the pillar reinforcement 13 is cut away.

As shown in FIGS. 11 and 12, a concaved portion 37 which is concaved downwardly from an upper face of the above-described reinforcement 21 is formed at a joint portion of the reinforcement 21 to the center pillar 5. This concaved portion 37 is, as shown in FIG. 12, formed over a range of the longitudinal length of the center pillar 5, and the vertical length H (see FIG. 11) of the reinforcement 21 at this range of the concaved portion 37 is shorter than the other portion without the concaved portion 37 (i.e., portions located in front and back of the center pillar 5) by a concave amount ΔH.

At this concaved portion 37 is formed a plurality of openings 38 (three openings in the present embodiment illustrated) so as to be located longitudinally. Specifically, each opening 38 is of a rectangular shape and arranged such that its four sides match the vehicle longitudinal direction and the vehicle lateral (width) direction, respectively.

Thus, the concaved portion 37 is formed at the upper face of the reinforcement 21 of the side sill 9 at the joint portion between the center pillar 5 and the side sill 9, and further the openings 38 are formed at the concaved portion 37. These concaved portion 37 and openings 38 promote deformation of the side sill 9 in the vehicle side collision, and constitutes a deformation promotion portion, which will be described specifically.

The center pillar 5 of the present embodiment comprises the pillar reinforcement 13 which includes the upper portion 23 and the lower portion 24 which are integrally provided above and below the border line P, and these portions 23, 24 comprises the side-wall portions 25, 29 which extend along the vehicle side face and the pairs of vertical-wall portions 26, 30 which extend inwardly, respectively. The pair of vertical-wall portions 30 of the lower portion 24 of the reinforcement 13 slants such that the distance therebetween increase gradually inwardly. Thus, the slant angle of the of vertical-wall portions 30 of the lower portion 24 of the reinforcement 13 is gentler than that of the vertical-wall portions 26 of the upper portion 23 of the reinforcement 13. Accordingly, the center pillar 5 can be restrained from coming into the inside of the vehicle compartment with a simple structure.

That is, since the pair of vertical-wall portions 30 of the lower portion 24 of the reinforcement 13 slants such that the distance therebetween increase gradually inwardly according to the present embodiment, when the vehicle side collision occurs and thereby the collision force acts on the lower portion 24 inwardly, the vertical-wall portions 30 are deformed easily so as to fall down (toward the pillar inner panel 12), so that crushing of the lower portion 24 is promoted. Meanwhile, since the vertical-wall portions 26 of the upper portion 23 including the upper portion and the middle portion of the pillar reinforcement 13 do not slant so much as the vertical-wall portions 30 of the lower portion 24 of the reinforcement 13, the load resistance of the upper portion 23 of the reinforcement 18 against the collision load can be properly secured. Thus, when the side-collision load acting inwardly is inputted to the center pillar 5, the lower portion of the center pillar 5 including the lower portion 24 is deformed greatly, so that the impact energy of the vehicle collision can be absorbed at this portion. Meanwhile, the deformation at the upper portion and the middle portion of the center pillar 5 including the upper portion 23 having the relatively high load resistance can be effectively restrained. The center pillar 5 is deformed in this deformation mode, so that it can be avoided that the center pillar 5 bends at the middle portion, in the vehicle vertical direction, and thereby comes into the inside of the vehicle compartment. Thereby, any improper interference of the center pillar 5 with passengers can be prevented effectively.

Figure 13:
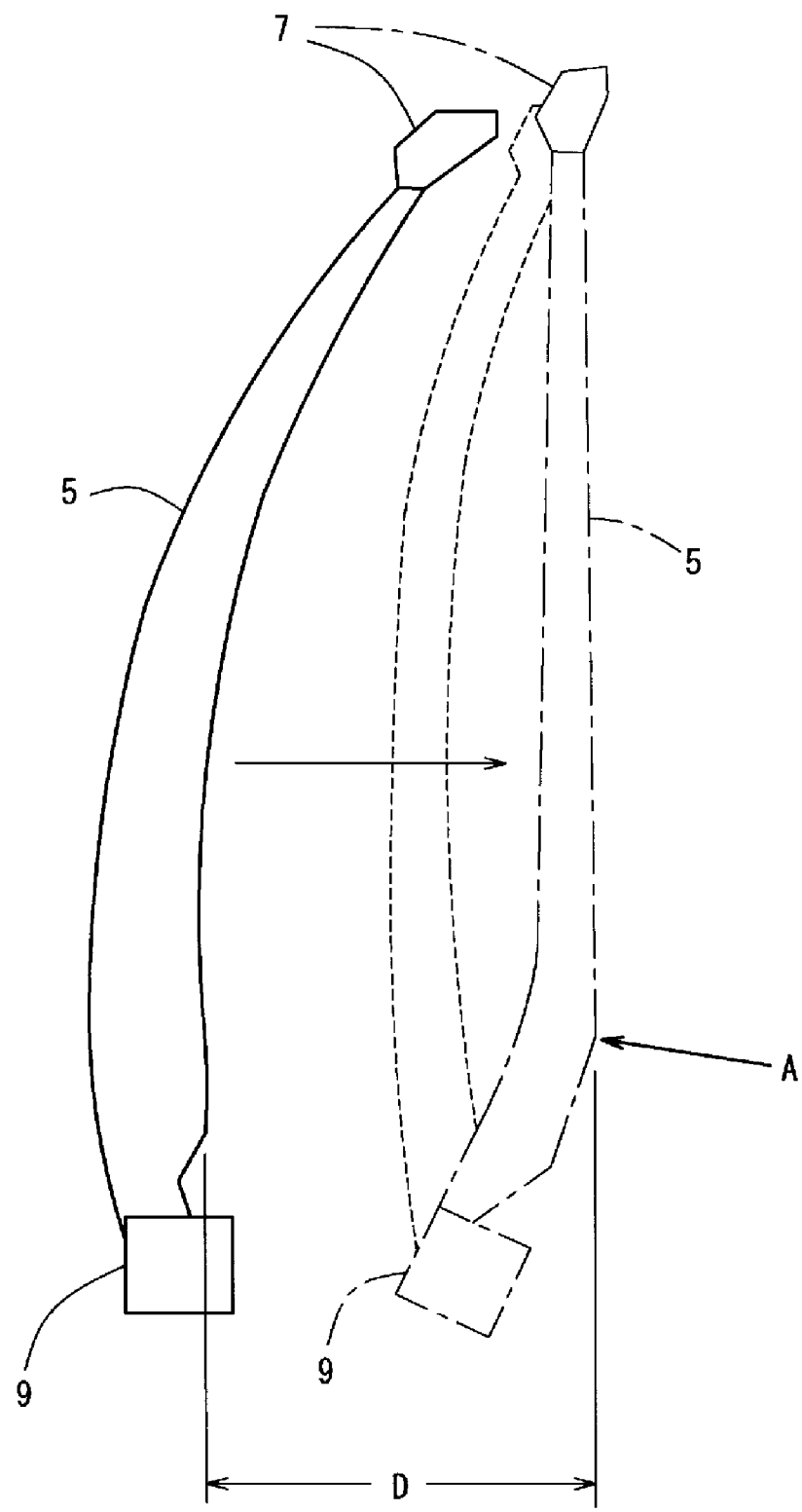
FIG. 13 is a schematic diagram showing a deformation mode of the center pillar in a vehicle collision.

This will be described specifically referring to FIG. 13. In this figure, the center pillar 5 in its normal state is shown by a solid line, and the one in its bending state when receiving the side-collision load is shown by a one-dotted broken line. Herein, a broken line imaginarily shows a state of the center pillar 5 before its bending (a deformation mode except for a bending mode). When the side-collision load is inputted to the center pillar 5 as shown in FIG. 13, the center pillar 5 is deformed inwardly, in the vehicle width direction, in accordance with the side-collision load. Herein, in case the lower portion 24 of the pillar reinforcement 13 is configured so as to be crushed easily as described above, the modulus of section of the lower portion of the center pillar 5 becomes smaller quickly by this crush, and thereby the bending deformation is promoted. Consequently, the center pillar 5 bends greatly at its lower portion and moves inwardly. Meanwhile, since the upper portion 23 of the pillar reinforcement 13 having the high load resistance is provided at the upper portion and the middle portion of the center pillar 5, the amount of deformation of the upper portion and the middle portion of the center pillar 5 is relatively small. In FIG. 12, the reason why the upper portion and the middle portion of the center pillar 5 have little bending, but only the lower portion of the center pillar 5 bends mainly is this.

Figure 14:
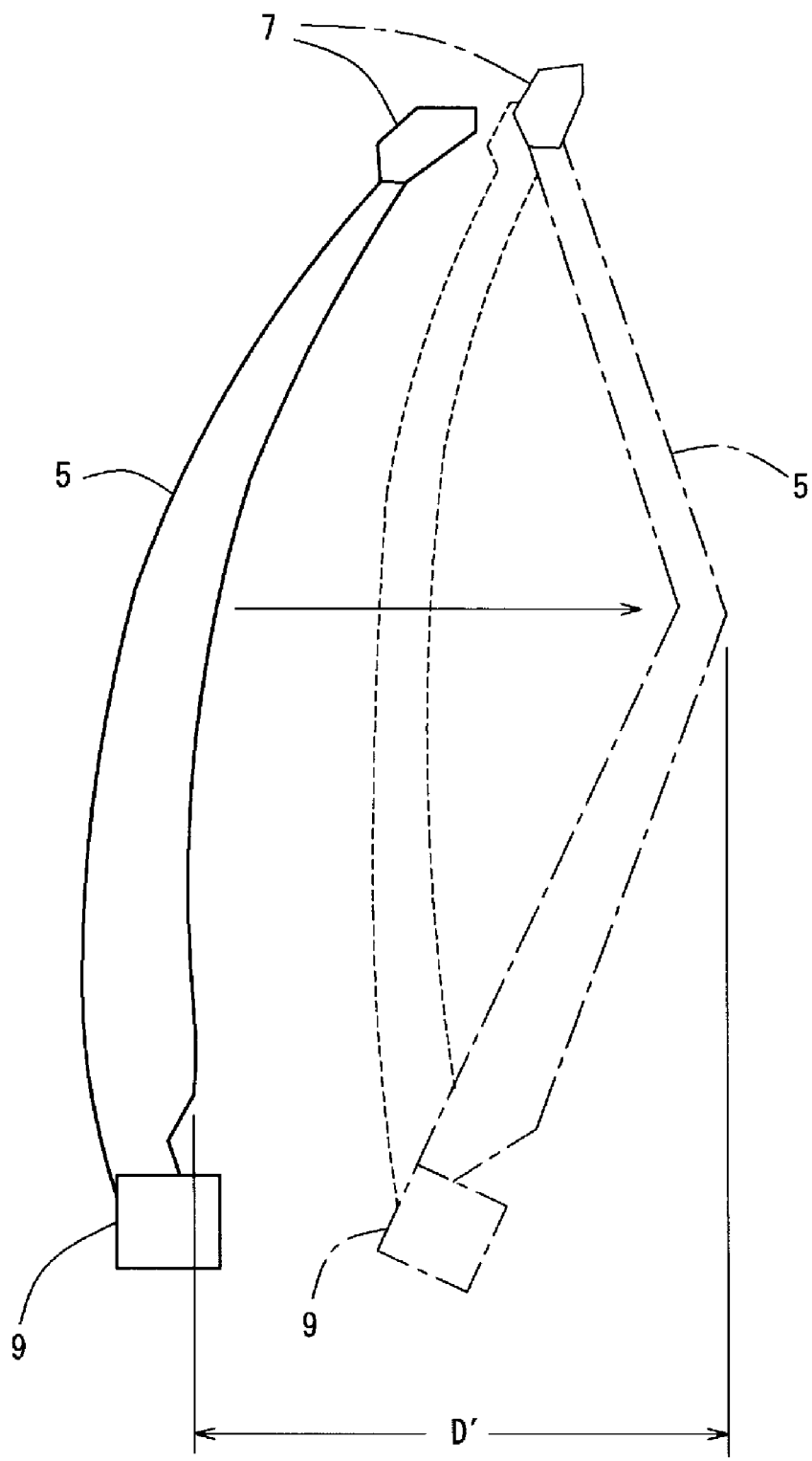
FIG. 14 is a schematic diagram showing a deformation mode of the center pillar in case the center pillar bends at a middle portion in a vehicle vertical direction, which is a comparative example to FIG. 13.

Meanwhile, in case the center pillar 5 bends at the middle portion as shown in FIG. 14, for example, this middle portion greatly comes into the inside of the vehicle compartment, so that there is a concern that the center pillar 5 would come to interfere with passengers. According to the present embodiment, however, the lower portion 24 of the pillar reinforcement 13 has the easily-crushable shape (structure) and thereby this lower portion 24 is greatly deformed in the vehicle side collision, so that the bending of the middle portion of the center pillar 5 can be prevented. Thereby, since the maximum inward-deformation amount D (FIG. 13) of the center pillar 5 is restrained so as to be smaller than the maximum inward-deformation amount D' (FIG. 14) in case the center pillar 5 bends at the middle portion, the amount of the center pillar 5 coming into the inside of the vehicle compartment can be effectively decreased, so that the safety of the passengers can be properly secured.

Moreover, according to the above-described structure, the bending of the middle portion of the center pillar 5 can be restrained by the very simple means of changing the sectional shape of the pillar reinforcement 13 (i.e., the upper portion 23 has the different sectional shape from the lower portion 24). Thereby, the center pillar 5 can be restrained from coming into the inside of the vehicle compartment more simply and effectively in the vehicle side collision.

Hereinafter, the move of the lower part 5b of the center pillar 5 when the center pillar bends will be described referring to FIG. 15. FIG. 15A is a sectional view of the lower part of the center pillar which explains an initial stage of the bending of the center pillar, and FIG. 15B is a sectional view of the lower part of the center pillar which explains a late stage of bending of the center pillar. As shown in FIG. 13, in case the center pillar 5 bends when receiving the side-collision load, at the lower part 5b where the deformation is promoted, the side-wall portion 29 of the lower portion 24 of the pillar reinforcement 13 starts crushing longitudinally along with a side-wall portion of the pillar outer panel 11 in the initial stage, as shown in FIG. 15A.

Thereby, at the lower portion 24, the flange-ridgeline portions 32 are deformed and thereby approaches the pillar inner panel 12, and also the tips of the flanges 31, 31, which are joined to the pillar outer panel 11 and the pillar inner panel 12, are pulled outwardly, that is, in a direction of peeling the flanges 31, 31 off the both end portions 53, 53 of the lower portion 52 of the pillar inner panel 12.

Herein, the both end portions 53, 53 are pulled longitudinally by the above-described pull load of the flanges 31 at the lower portion 52 of the pillar inner panel 12, and the beads 54, 54 are extended longitudinally by the above-described pull load as shown in FIG. 15A.

Then, as the deformation of the lower part 5a of the center pillar 5 progresses, in a middle stage of the vehicle side collision, the flange-ridgeline portions 32 come into inside spaces of the concaved beads 54 (that is, the flange-ridgeline portions 32 come into the gaps G formed between the flange-ridgeline portions 32 and the pillar inner panel 12). Further, in the late stage, the flange-ridgeline portions 32 come to contact the extended beads as shown in FIG. 15B. After this contact of these portions 32, 54, the beads 54 are further extended in accordance with the deformation of the flange-ridgeline portions 32, and finally the flange-ridgeline portions 32 and the beads 54 are deformed to curve together so as to overlap with each other, keeping a joint state between the flanges 31 and the both end portions 53.

According to the present embodiment, since the length L3 of the covering portion 52a of the lower portion 52, that is, the length L3 (see FIG. 10) of the lower portion 52 from the inside end 53i of one of the end portions 53 to the inside end 53i of the other of the end portions 53, is longer than the distance L4 (see FIG. 10) between the pair of flange-ridgeline portions 32, 32, the covering portion 52a of the lower portion 52 of the pillar inner panel 12 can be deformed properly in accordance with the deformation of the flange flange-ridgeline portions 32. Thereby, the shearing load acting on the joint portion between the both end portions 53 of the lower portion 52 of the pillar inner panel 12 and the flanges 31 of the lower portion 24 of the pillar reinforcement 13 can be decreased, so that detachment of these portions 53, 31 can be prevented.

Accordingly, by configuring that at one of the two parts of the center pillar 5 (the upper part 5a), the length L1 of the covering portion 51a (that is, the length L1 from the inside end 53i of one of the both end portions 53 to the other inside end 53i of the other of the both end portions 53) (see FIG. 9) is substantially equal to the distance L2 between the pair of flange-ridgeline portions 28, 28 (see FIG. 9), whereas, at the other part of the center pillar 5 (the lower part 5b), the length L3 of the covering portion 52a of the pillar inner panel 12 (that is, the length L3 from the inside end 53i of one of the both end portions 53 to the other inside end 53i of the other of the both end portions 53) (see FIG. 10) is longer than the distance L4 between the pair of flange-ridgeline portions 32, 32 of the pillar reinforcement 13 (see FIG. 10), the decreasing of the shearing load can be achieved properly, securing the appropriate load resistance of the upper part 5a against the side-collision load and promoting the deformation of the lower part 5b.

Further, since the beads 54 are formed so as to generate the gap G between the flange-ridgeline portions 32 and the pillar inner panel 12 to secure the above-described length L3 of the lower portion 52 of the pillar inner panel 12, it can be prevented that the pillar inner panel 12 is pressed inwardly quickly by the flange-ridgeline portions 32 at the initial stage of the deformation of the center pillar 5. Thus, the above-described shearing load acting on the joint portion between the both end portions 53 of the pillar inner panel 12 and the flanges 31 of the pillar reinforcement 13 can be further decreased.

Particularly, since the beads 54 are formed only at the specific positions which face to the flange-ridgeline portions 32, a large area can be secured at a plane (straight) portion of the covering portion 52a of the pillar inner panel 12 except for the beads 54. Accordingly, the appropriate load resistance against the above-described pull load in the deformation of the pillar reinforcement 13 can be secured by the above-described plane portion, and the shearing load can be decreased by the extension of the beads 54.

The present inventors found through their researches that the above-described shearing load becomes greater in case the rigidity of the pillar reinforcement 13 is set to be greater than that of the pillar inner panel 12. Therefore, the effect of the decrease of the shearing load by setting the length L3 of the covering portion 52a which covers the opening portion 24a between the pair of flange-ridgeline portions 32, 32 becomes more outstanding in case the rigidity of the pillar reinforcement 13 is greater than that of the pillar inner panel 12.

Especially, since the above-described decrease structure of the shearing load is applied to the center pillar 5 which may easily receive the collision load in the vehicle side collision as the present embodiment, any passenger in the vehicle compartment can be protected more securely from the collision load.

Further, according to the present embodiment, as shown in FIG. 10, the vertical-wall portion 30 of the lower portion 24 of the pillar reinforcement 13 comprises the base portion 30a which extends inwardly, in the vehicle width direction, from the side-wall portion 29, the slant portion 30b which extends obliquely, and the corner portion C between these portions 30a, 30b. Since the vertical-wall portion 30 of the lower portion 24 bends easily at this corner portion C where the stress may concentrate in the vehicle side collision and falls down toward the inside of the vehicle (toward the pillar-inner-panel side), the deformation of the lower portion of the center pillar 5 including the lower portion 24 can be promoted effectively. Accordingly, the bending of the middle portion of the center pillar 5 is prevented, and thereby the passenger's protection can be achieved securely.

Moreover, since the relatively large opening 39 (see FIGS. 6 and 7) is formed at the lower portion 24 of the pillar reinforcement 13 in the present embodiment, the load resistance of the lower portion 24 can be lower than that of the upper portion 23, so that deformation of the lower portion of the center pillar 5 in the vehicle side collision can be promoted more effectively.

According to the present embodiment, as shown in FIGS. 2, 6, 7 and others, the hinge attachment portions 35, 36 of the door hinges 41, 42 for the rear side door 3 are provided at the upper portion 23 of the pillar reinforcement 13. Thereby, since the rear door is supported at the upper portion 23 having the high load resistance via the door hinges 41, 42, the support rigidity of the rear side door 3 can be increased effectively.

More specifically, according to the present embodiment, the lower hinge attachment portion 36 of the lower door hinge 42 for the rear side door 3 is provided near the lower end of the upper portion 23, and the concaved groove 34 as the bending promotion portion to cause bending of the center pillar 5 in the vehicle side collision is formed at the specified position which is located above the lower hinge attachment portion 36. Thereby, since the center pillar 5 tends to bend at the position of the concaved groove 23a (a portion A in FIG. 13) in accordance with the collision load inputted from the lower door hinge, bending of the middle portion of the center pillar 5 can be more securely prevented. Consequently, any improper interference of the bending center pillar with passengers can be avoided more effectively.

That is, the load applied to the rear side door 3 in the vehicle side collision is transmitted via the impact bar 45 as the reinforcing member (FIG. 2) mainly, and then inputted to the center pillar 5 via the pair of door hinges 41, 42. Herein, in case the lower door hinge 42 is attached near the lower end of the upper portion 23 and the concaved groove 34 is provided above its attachment portion (lower hinge attachment portion 36) as described above, when the side-collision load is inputted from the lower door hinge 42, the pillar reinforcement 13 bends at the weak concaved groove 34. Thereby, it can be effectively prevented that the center pillar 5 bends at the middle portion, in the vehicle vertical direction, so that it interferes with passengers.

As shown in FIGS. 11 and 12, the concaved portion 37 as the deformation promotion portion which promotes the deformation of the side sill 9 when the center pillar 5 receives the vehicle side collision is formed at the upper face of the reinforcement 21 of the side sill 9 which corresponds to the joint portion to the center pillar 5. Thereby, the vertical width of the reinforcement 21 becomes smaller by the one of the concaved portion 37, so that the rigidity of the joint portion of the side sill 9 to the center pillar 5 becomes lower than that of the other portion. Also, the bending deformation of the reinforcement 21 caused by the border portion (corner portion) between the upper face of the reinforcement 21 and the concaved portion 37 is promoted. Accordingly, it can be effectively prevented that the deformation of the lower portion of the center pillar 5 is hindered by the side sill 9 in the vehicle side collision, so that a desired deformation mode (FIG. 13) may not be obtained.

That is, it is necessary for the lower portion (portion corresponding to the lower portion 24 of the pillar reinforcement 13) of the center pillar 5 to be deformed greatly and bend in order that the center pillar 5 can be deformed in the deformation mode shown by the one-dotted broken line in FIG. 13. Therefore, it is also necessary that the side sill 9 is relatively greatly deformed accordingly. In this case, however, if the rigidity of the side sill 9 is too high, the deformation may be restrained too much, so that there is a concern that the deformation of the center pillar 5 in the above-described mode would be deteriorated by the side sill 9. According to the present embodiment, however, since the concaved portion 37 is formed at the joint portion of the side sill 9 to the center pillar 5, the deformation of the side sill 9 can be promoted in the vehicle side collision by an existence of the concaved portion 37, so that the deformation in the desired mode shown by the one-dotted broken line in FIG. 13 can be securely provided.

Moreover, since the openings 38 are formed at the specified portion of the upper face of the reinforcement 21 of the side sill 9 where the concaved portion 37 are positioned in the present embodiment, the rigidity of this portion of the side sill 9 can be lower than that of the other portion of the side sill 9. Thereby, the improper situation where the side sill 9 hinders the deformation of the center pillar 5 so that the desired deformation mode may not be obtained can be prevented effectively.

Particularly, according to the present embodiment, since the opening 38 is of the rectangular shape and arranged such that its four sides match the vehicle longitudinal direction and the vehicle width direction, respectively, the desired deformations of the side sill 9 both in the vehicle longitudinal direction and the vehicle width direction can be promoted by the opening 38. Thus, the above-described deformation of the center pillar 5 in the desired mode can be more securely achieved.

Herein, while the material of the pillar reinforcement 13 has not been described in particular, it may be preferable that it be made of a press member which is formed through a thermal pressing (hot stamping), for example. The thermal pressing means a process in which a steel plate in its heated state is pressed by using a die. In this process, the rigidity of the steel plate can be increased considerably through its hardening which is caused by a quick cooling with the die. In case the pillar reinforcement 13 is made of the press member formed through the thermal pressing, the center pillar 5 can be reinforced without increasing its weight, and bending of its middle portion in the vehicle side collision can be prevented securely.

While using the press member formed through the thermal pressing for the pillar reinforcement 13 may cause reinforcing the lower part of the center pillar 5 which is required to be deformed relatively greatly, the load resistance of this lower part of the center pillar 5 against the side-collision load can be properly decreased relatively by configuring the shape of the lower portion 24 of the pillar reinforcement 13 as described above (i.e., the vertical-wall portions 30 of the lower portion 24 slant greatly and the like). Consequently, even if the pillar reinforcement 13 is made of the press member formed through the thermal pressing, the desired deformation mode shown in FIG. 13 can be obtained properly.

Further, in case the vertical-wall portion 30 of the lower portion 24 is formed in the bend shape in which the corner portion C is formed between the base portion 30a and the slant portion 30b (see FIG. 10) like the present embodiment, there occurs a difference in the cooling speed during the thermal pressing between the base portion 30a and the slant portion 30b, so that there exists a specified difference in the rigidity between them as well. This rigidity difference can secure the situation where the corner portion C causes the deformation in the vehicle side collision, and thereby the lower portion 24 can be crushed more easily. Thus, the lower part of the center pillar 5 including the lower portion 24 is greatly deformed relatively in the vehicle side collision, so that the bending of the middle portion of the center pillar 5 can be prevented more securely.

While both the concaved portion 37 and the openings 38 are formed at the joint portion of the side sill 9 to the center pillar 5 as the formation promotion portion to promote the side sill 9 in the side collision in the present embodiment, only any one of the concaved portion 37 and the openings 38 may be provided because it is fine that the deformation of the side sill 9 is promoted to a degree in that the deformation of the center pillar 5 in the desired deformation mode may not be hindered.

Figure 16A:
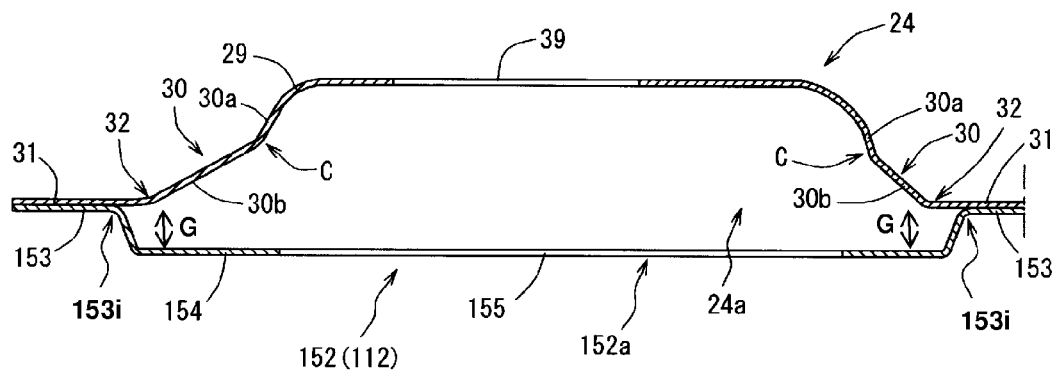
FIGS. 16A, 16B and 16C are sectional views showing some modifications of the embodiment of the present invention.
Figure 16B:
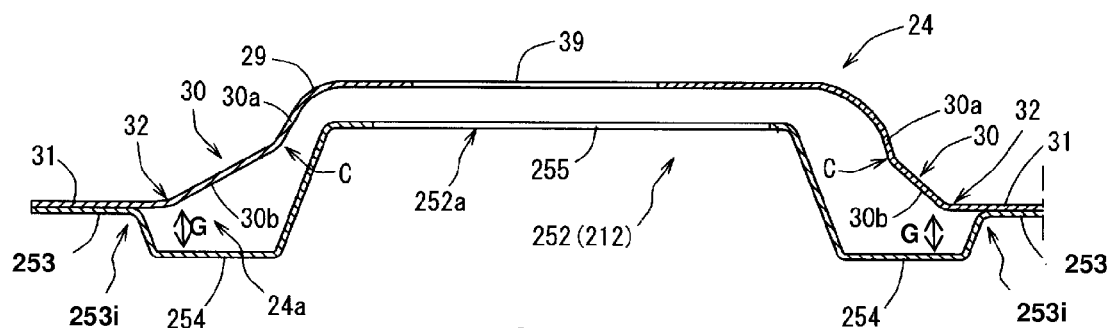

While the two beads 54 are formed to secure the length L3 of the covering portion 52a of the lower portion 52 of the pillar inner panel 12 in the present embodiment, the present invention should not be limited to this. For example, as shown in FIGS. 16A and 16B, a pillar inner panel 112 (a lower portion 152) and a pillar inner panel 212 (a lower portion 252) may be formed to have a U-shaped cross section, respectively, so that the above-described length of a covering portion 152a and a covering portion 252a can be secured. Herein, the same components as those of the above-described embodiment are denoted by the same reference characters, descriptions of which are omitted here.

In an example shown in FIG. 16A, a side-face portion 154 which is formed between both end portions 153, 153 of the pillar inner panel 112 is formed to project inwardly in the vehicle width direction. In another example shown in FIG. 16B, meanwhile, a side-face portion 254 which is formed between the both end portions 253, 253 of the pillar inner panel 212 is formed to project outwardly, i.e., toward the pillar reinforcement 13.

Further, in the examples shown in FIGS. 16A and 16B, respective inside ends 153i, 253i of the both end portions 153, 253 of the pillar inner panels 112, 212 (lower portions 152, 252) are located outside away from the flange-ridgeline portion 32 of the pillar reinforcement 13 as well as the above-described embodiment. Thereby, as described in the above-described embodiment, some gap G is formed between the flange-ridgeline portion 32 of the pillar reinforcement 13 and the pillar inner panels 112, 212.

Figure 16C:
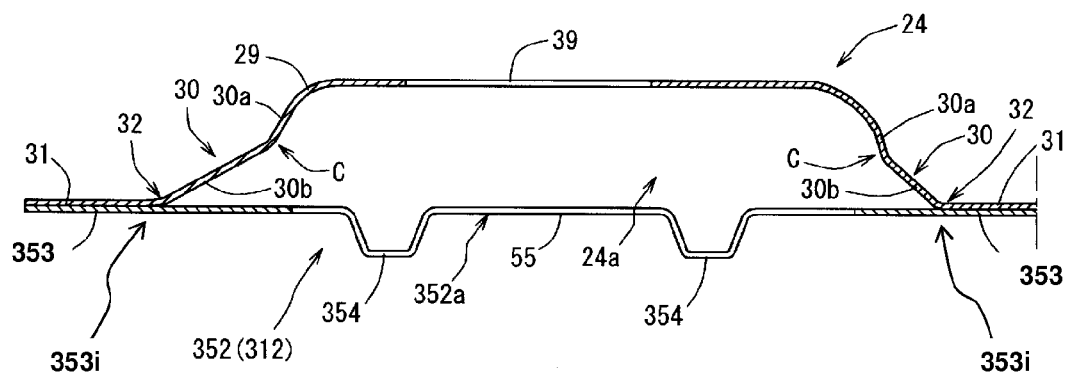

However, the present invention should not be limited to the above-described structure in which the inside ends of the end portions of the pillar inner panel are located outside away from the flange-ridgeline portions of the pillar reinforcement such that the gap are formed between the flange-ridgeline portions of the pillar reinforcement and the pillar inner panel as long as the length L3 of the covering portion is longer than the distance between the pair of flange-ridgeline portions. For example, as shown in FIG. 16C, the flange-ridgeline portions 32, 32 of the pillar reinforcement 13 may contact a pillar inner panel 312 as long as the above-described necessary length of a covering portion 352a of the pillar inner panel 312 (lower portion 352), that is, the length from an inside end 353i of its end portion 353 to another inside end 353i of the end portion 353, is secured by forming beads 354, 354. Herein, in FIGS. 16A-16C, reference numerals 155, 255, 355 denote openings which correspond to the opening 55 formed at the pillar inner panel 12 (lower portion 52), respectively.

What is claimed is:

1. A vehicle-body structure of a vehicle, comprising:
a reinforcement of a center pillar of the vehicle having a U-shaped cross section with an open portion at one side thereof, the reinforcement including a pair of flanges at both ends thereof and a pair of flange-ridgeline portions which is formed at respective inside ends of the pair of flanges; and
an inner panel of the center pillar joined to the pair of flanges of the reinforcement at both end portions thereof so as to cover the open portion of the reinforcement, the inner panel being arranged on an inward side, in a vehicle width direction, of the reinforcement,
wherein the vehicle-body structure has a closed cross section which is formed by the reinforcement and the inner panel of the center pillar and extends in a vertical direction of the vehicle,
the vehicle-body structure comprises at least two parts which are formed at an upper portion and a lower portion of the center pillar,
the reinforcement and the inner panel of the center pillar of the vehicle-body structure are configured to have respective shapes in a plane which is perpendicular to the vertical direction of the vehicle such that, at said upper portion of the center pillar, the inner panel of the center pillar is configured to have a substantially even shape so that a distance between the pair of flange-ridgeline portions of the reinforcement is substantially equal to a length of the inner panel from an inside end of one of the both end portions to an inside end of the other of the both end portions, whereas, at said lower portion of the center pillar, the inner panel of the center pillar is configured to have an uneven shape so that a length of the inner panel from the inside end of one of the both end portions to the inside end of the other of the both end portions is longer than a distance between the pair of flange-ridgeline portions of the reinforcement,
the reinforcement of the center pillar comprises a pair of vertical-wall portions which extends continuously from the pair of flanges via the pair of flange-ridgeline portions, at least one of the vertical-wall portions of the reinforcement includes a slant portion which has a specified slant angle such that the vertical-wall portion stands up gradually from one of the pair of flanges, and the reinforcement is configured such that the specified angle of the slant portion of the reinforcement at said lower portion of the center pillar is gentler than that of the reinforcement at said the upper portion of the center pillar.

2. The vehicle-body structure of a vehicle of claim 1, wherein said reinforcement and said inner panel of the center pillar are joined to each other such that said pair of flange-ridgeline portions of the reinforcement contacts the both end portions of the inner panel, respectively, at said upper portion of the center pillar, whereas said inside ends of the both end portions of the inner panel contact specified positions of said flanges of the reinforcement which are located outside away from said pair of flange-ridgeline portions, respectively, such that a gap is formed between the pair of flange-ridgeline portions of the reinforcement and the inner panel at said lower portion of the center pillar.

3. The vehicle-body structure of a vehicle of claim 2, wherein said inner panel includes beads which are concaved toward an opposite side to said reinforcement, the beads being formed at specified portions of the inner panel which face to said pair of flange-ridgeline portions of the reinforcement.

4. The vehicle-body structure of a vehicle of claim 1, wherein said reinforcement has a rigidity which is higher than that of said inner panel.

5. The vehicle-body structure of a vehicle of claim 1, wherein each of said pair of vertical-wall portions of the reinforcement comprises a base portion which extends substantially in the vehicle width direction and a corner portion which is formed between said base portion and said slant portion.

6. The vehicle-body structure of a vehicle of claim 1, wherein a hinge attachment portion of a rear door is provided at said upper portion of the center pillar.

7. The vehicle-body structure of a vehicle of claim 1, wherein a hinge attachment portion of a rear door is provided at said center pillar, and a bending promotion portion to cause bending of the center pillar when the center pillar receives a load of vehicle side collision is formed at a specified position of said reinforcement which is located above said hinge attachment portion.

* * * * *